(12) United States Patent
Miller et al.

(10) Patent No.: US 7,139,263 B2
(45) Date of Patent: Nov. 21, 2006

(54) VOICE OVER IP ARCHITECTURE

(75) Inventors: Frank William Miller, Baltimore, MD (US); Aaron Jip Sipper, Silver Spring, MD (US)

(73) Assignee: Sentito Networks, Inc., Rockville, MD (US)

( * ) Notice: Subject to any disclaimer, the term of this patent is extended or adjusted under 35 U.S.C. 154(b) by 992 days.

(21) Appl. No.: 10/071,088

(22) Filed: Feb. 11, 2002

(65) Prior Publication Data

US 2003/0076815 A1   Apr. 24, 2003

Related U.S. Application Data

(60) Provisional application No. 60/330,330, filed on Oct. 19, 2001.

(51) Int. Cl.
*H04L 12/66* (2006.01)
*H04M 7/00* (2006.01)

(52) U.S. Cl. .................. 370/352; 370/389; 370/401; 370/410; 379/228

(58) Field of Classification Search ............... 370/352, 370/356, 401, 493, 412, 494, 389, 395.2; 379/219, 220.01, 221.12
See application file for complete search history.

(56) References Cited

U.S. PATENT DOCUMENTS 6,683,881 B1 * 1/2004 Mijares et al. ............... 370/401
6,765,912 B1 * 7/2004 Vuong ...................... 370/395.2
6,915,421 B1 * 7/2005 Kalmanek, Jr. et al. ..... 713/153
6,920,144 B1 * 7/2005 Niermann .................... 370/401

\* cited by examiner

*Primary Examiner*—Hanh Nguyen
(74) *Attorney, Agent, or Firm*—Volentine Francos & Whitt

(57) ABSTRACT

A Voice over Internet Protocol (VoIP) network is described in which session state is maintained in access switches, but not signaling gateways which maintain transaction state only during pendency of a related transaction. The signaling gateway further provides transparent inter-operation between the VoIP network and non-IP networks, such as the PSTN, by means of a translator which directly translates messages between the networks.

10 Claims, 14 Drawing Sheets

VOICE OVER IP ARCHITECTURE

CROSS REFERENCE TO RELATED APPLICATION

This application claims the benefit of U.S. Provisional Application No. 60/330,330 filed Oct. 19, 2001.

BACKGROUND OF THE INVENTION

1. Field of the Invention

The present invention relates to telecommunications system architectures, and more specifically to Voice over Internet Protocol (VoIP) architectures. Improved access methodologies and system components, including an access switch and signaling gateway, are described within the context of a novel VoIP architecture. These improved system components and methodologies manage session state more efficiently and provide a clear migration path from conventional system architectures.

2. Description of the Related Art

Although VoIP has been in existence for many years, evolving service demands are forcing a rapid evolution of VoIP technology. The pace at which new services are being integrated into existing networks continues to increase as VoIP products and services develop.

Though still evolving, packet-based telephony is becoming increasingly sophisticated. Indeed, voice protocols have developed to offer a rich set of features, scalability, and standardization than what was unavailable only a few years ago.

Critical to success of any telecommunications system is the ability to deploy value-added and high margin services. For many reason, a few of which are discussed below, VoIP and other IP-based technologies are best positioned to realize these profitable services.

Economics is perhaps the single greatest motivation for the development and deployment of VoIP. Increased competition among existing and emerging voice service vendors has brought tremendous downward pressure on the cost of voice services in the telecommunications market. This trend is likely to continue with further declines in the price of voice services.

Additionally, many existing networks support mostly data (Internet) services that are based on IP. Many services provider already own and will continue to build-out IP infrastructures. New service providers wishing to enter the voice services market will almost certainly transport voice traffic across the existing IP backbone. Building a parallel voice services network based on legacy circuit-switching equipment is simply not a cost-effective option.

Many emerging competitive local exchange carriers (CLECs) are sensitive to the cost of developing voice service networks. For many, the cost of legacy voice circuit-switching equipment is prohibitively high. Also the cost of the space, personnel, and operations capabilities required to maintain such networks is prohibitive. These carriers need a network that can be leveraged to realize other data services, such as Internet, virtual private networks, and managed network offerings. In order to provision such services and provide voice services, VoIP is an ideal solution.

Major telecommunications carriers are looking for ways to cut the cost of running and upgrading existing voice networks. These carriers want to replace and augment their existing networks with VoIP solutions for many of the reasons described above. Additionally, VoIP offers the carriers a path to circumvent existing tariff regulations. That is, carriers may use data services to transport voice calls to get around traditional (regulated) pricing structures and reduce the total cost of voice services.

In addition to cost advantages, VoIP networks offer compelling technical advantages over circuit switching networks. VoIP networks are more open to technical improvement and competition-drive improvement than circuit-switching networks which are dominated by entrenched equipment vendors. The open, standards-based architecture provided by VoIP networks allows greater interchangeability and more modularity than proprietary, monolithic, circuit-switching networks. Open standards also translate into the realization of new services that are rapidly developed and deployed, rather than waiting for a particular vendor to develop a proprietary solution.

In sum, the promise offered by VoIP technology is just beginning to be realized. As will be discussed hereafter, the contemporary state of VoIP technology and architecture is not without limitations and disadvantages. Yet, the utility offered by VoIP networks, as compared to traditional circuit-switching networks, is immense and beyond question. The issue is really one of optimally defining a VoIP architecture and providing enabling system components and access methodologies.

The advantages and preferred implementation of the present invention are best viewed and understood against the backdrop of the contemporary VoIP architectures. However, an understanding of contemporary VoIP technology requires at least some understanding of the public switched telephone network (PSTN).

There are four major tasks performed by the PSTN to connect a call. While the PSTN is capable of providing other services beyond point-to-point voice calls such services are predicated upon the following basic tasks: (1) signaling; (2) database services; (3) call set-up and tear-down; and (4) analog voice to digital data conversion.

Phones calls are inherently connection oriented. That is, a connection to the called entity must be established ahead of time before a conversation can occur. Switches, the central components in the PSTN, are responsible for creating this connection. Between the circuit switches are connections (trunk lines) that carry the voice traffic. These links vary in data communication speed from T-1 and E-1 to OC-192/STM-64, with individual channels (DS-0s) in each link type representing one voice channel. Switches are also responsible for converting the analog voice signal into a digital data format that may be transported across the network.

Signaling notifies both the network and its users of important events. Examples of signaling range from telephone ringer activation to the dialing of digits used to identify a called entity. Network elements also use signaling to create connections through the network.

The Signaling System Seven (SS7) is a standard, packet-based network that transports signaling traffic between the switches involved in the call. FIG. 1 illustrates the basic flow of a telephone call through the PSTN and SS7 network. A call begins when a user dials a destination phone number using call origination equipment 1. A local switch (not shown) typically analyses the destination number to determine if the call is a local one. If the call is local, the local switch may directly connects the call. More typically, the dialed telephone number results in a query to one or more service control points (SCP) 3. SCPs are databases that execute queries and translate the dialed telephone phone numbers into a set of circuit switching commands. SCPs also allow such common telephone features as 800 number support, 911 service, and caller ID. Signaling switch points (SSPs, not shown) are the interface between switches 4 and the SS7 network. It is here that SS7 messages are translated into the connection details required by the switches to physically connect the call origination point to the call destination point.

The SS7 control network is "out of band," that is, it is not transmitted within the same links used to carry the actual voice channels. Specialized equipment called Signal Transfer Points (STPs) 6 transport the SS7 signaling messages. As will be seen hereafter, these STPs are analogous to IP routers in that the messages are carried in data packets called message transfer parts.

The SS7 network is very expansive and has been built up over many decades of effort and expense. Indeed, the SS7 network is actually a collection of signaling networks deployed throughout the developed world. There are many technical and historical reasons why the signaling portion of the network is broken out from the rest of the system. However, the greatest value in such a design is the ability to add network intelligence and features without a dependency on the underlying circuit-switching infrastructure.

Ultimately, the destination switch signals the destination equipment 5 that a call has arrived, typically by activating a ringer. When the called party picks up the receiver and completes the circuit, a conversation may take place. Throughout the conversation, switches convert analog voice signals into digital data capable of being transported over the network.

Once the call is complete, the switches notify the SS7 network which "tears-down" the circuit connections. In contrast to the "setup" function that identifies and enables the collection of circuit connections that facilitate the call, the tear-down function disables the connections, thus freeing up the switching resources for subsequent use by the network. As one would suspect there are many more details involved in making a telephone call, but these steps describe the basic flow of events. For example, a great many supervisory messages are communicated via the SS7 network during any one completed call.

Of particular note are the concepts of "call state" and "call control." Call state is a general term referring to a great quantity of data that is maintained within the network. Call state may be stored at numerous points within the network. It includes at least data identifying the origination point of a call, the destination point for the call, and the switching control data required to connect the two points. Call state may also include data identifying particular mechanisms being used to implement and transport the call, such as analog-to-digital conversion type, echo cancellation parameters, noise elimination techniques, and silence suppression conditions, etc. Call state is maintained (stored) within the network throughout the entire pendency of the call, i.e., between call set-up and call tear-down.

Whereas call state typically defines the nature and quality of a call, call control defines "actions" associated with the call. Call control is often software code communicated in relation to a call. Execution of the code accomplishes the desired action. Actions include, as examples, commands to activate a ringer, send a dial tone, detect dialed digits, and send signaling data.

Like the PSTN, components forming a VoIP network must perform four basic functions: (1) signaling; (2) database services; (3) call connection and disconnection (bearer control); and (4) CODEC operations. FIG. 2 conceptually illustrates the VoIP network.

For purposes of this description, the IP Backbone can be viewed as one logical switch. The logical switch is, however, a distributed system. The IP backbone provides connectivity amongst a great number of distributed elements. Depending on the VoIP protocols used, this system as a whole is sometimes referred to as a softswitch architecture.

Signaling in a VoIP network is just as critical as it is in the legacy phone system. The signaling in a VoIP network activates and coordinates the various components to complete a call. Although the underlying nature of the signaling is the same, there are some technical and architectural differences.

Signaling in a VoIP network is accomplished by the exchange of IP datagram messages between network components. The format for these messages is covered by a number of standards, or protocols. Regardless of the protocol or hardware components used, the messages are critical to the function of a voice-enabled IP network and need special treatment to guarantee their delivery across the IP backbone.

Among other functions, database services are a way of locating an endpoint and translating an address communicated between two (usually heterogenous) networks linked by the VoIP backbone. For example, the PSTN uses phone numbers to identify endpoints, while a VoIP network might use a Universal Resource Locator (URL) or an IP address with port numbers to identify an endpoint. A call control database contains the necessary mappings and translations to identify endpoints. Functionally similar to call state and call control in the PSTN, "session state" in a VoIP network defines the nature of the call and controls the activities of components in the network.

The connection of a call in a VoIP network is made by two endpoints opening a communication session between each other. In the PSTN, the public (or private) switch connects logical DS-0 channels through the network to complete a call. In a VoIP implementation, this connection is a multimedia stream (audio, video, or both) transported in real time between endpoints. This connection is referred to as the bearer (or payload) channel and represents the voice or video content being delivered. When communication is complete, the IP session is ended and network resources are released.

As already noted, voice communication is analog, while data networking requires digital data. The process of converting analog voice into digital data is done by a coder-decoder (CODEC). There are many well known ways to convert analog voice into digital data. The processes used to convert, compress, and otherwise manipulate voice data in digital form are numerous and complex. Most are governed by publicly available standards.

The major components of a VoIP network are similar in functionality to the components forming a circuit-switched network. VoIP networks must perform all of the same tasks performed by the PSTN, in addition to providing a gateway between the VoIP network and the existing PSTN. Although using different technologies and approaches, some of the same component concepts that make up the PSTN are found in VoIP networks. As illustrated in FIG. 2, there are three general components forming a VoIP network: (1) media gateways 8; (2) media gateway controllers 9; and (3) the IP backbone 7.

Media gateways are responsible for call origination, call detection, and CODEC functions, including at least analog-to-digital conversion and voice packet creation. In addition, media gateways have optional features, such as data compression, echo cancellation, silence suppression, and statistics gathering. Media gateways form the interface allowing voice data to be transported across the IP network. In other words, media gateways are the source of bearer traffic. Typically, each call is a single IP session transported by a Real Time Transport Protocol (RTP) that runs over a User Datagram Protocol (UDP). Media gateways exist in several forms, ranging from a dedicated telecommunication equipment chassis to a generic PC running VoIP software.

Media gateway controllers house the signaling and control services that coordinate the media gateway functions. Media gateway controllers are responsible for call signaling coordination, phone number translations, host lookup, resources management, and signaling gateway services to the PSTN.

The IP infrastructure must ensure smooth delivery of the voice and signaling packets to the VoIP components. Due to their dissimilarities, the IP network must treat voice and data traffic differently. That is, voice and data traffic require different transport handling consideration and prioritization.

While there is correlation between VoIP and circuit-switching components, there are also many significant differences. One difference is found in the transport of voice traffic. Circuit-switching telecommunications can best be described as a Time-Division-Multiplexing (TDM) network that dedicates channels or reserves bandwidth as it is needed out of the trunk lines interconnecting an array of switches. For example, each phone call reserves a single DS-0 channel, and an associated end-to-end connection is formed to enable the call.

In contrast to the circuit-switching network, IP networks are packet-based networks based on the idea of statistical availability. Individual packets may be transported via a multiplicity of different paths through the IP network. This phenomenon often requires data packets to stop and be stored during their journey across the VoIP network. When this happens some form of queue management is required assess and handle the packets according to their priority indication. Accordingly, a packet prioritization schedule or Class of Service (CoS) definition is used to direct packets from specific VoIP applications in an appropriate manner. Such prioritization of IP network resources allows voice applications to coherently function across the IP network without being adversely affected by other data traffic on the IP backbone.

As noted above, the VoIP environment is one defined by standards. Two major standards bodies govern multimedia delivery over packet-based networks: the International Telecommunications Union (ITU) and the Internet Engineering Task Force (IETF). These two organizations are responsible for multiple protocols and equipment standards commonly used by participants in the VoIP market. A basic understanding of existing protocols is necessary to fully appreciate the present invention. These standards will be briefly described below, but a compete description may be readily obtained from numerous public sources including the organizations noted above.

Signaling System Seven SS7)

SS7 has been previously referenced in the discussion of the PSTN. FIG. 3 conceptually illustrates SS7 which is a widely used suite of telephony protocols expressly designed to establish and terminate phone calls. The SS7 signaling protocol is implemented as a packet-switched network. SS7 is both a protocol and a network designed to signal voice services. SS7 is a unified interface for the establishment of circuit-switching, translation, and billing services.

SS7 is not built on top of other protocols. Rather, as shown in FIG. 3, it is completely it own protocol suite from physical layer to application layer. For networks transporting SS7, it is important that these services be either translated or tunneled through the IP network reliably. Given the importance of SS7 signaling, it is necessary to ensure that these messages are given priority in the network. VoIP networks require access to the SS7 facilities in order to bridge calls onto the PSTN.

H.323

ITU recommendation H.323 specifies a packet-based multimedia communication system. The specification defines various signaling functions, as well as media formats related to packetized audio and video services.

H.323 standards were generally the first to classify and solve multimedia delivery issues over Local Area Networks (LAN) technologies. However, as IP networking and the Internet became prevalent, many Internet RFC standard protocols and technologies were developed and sometimes based on H.323 ideas. H.323 networks consist of media gateways and gatekeepers. Gateways serve as both H.323 termination endpoints and interfaces with non-H.323 networks, such as the PSTN. Gatekeepers function as a central unit for call admission control, bandwidth management, and call signaling. A gatekeeper and all its managed gateways form a H.323 "zone." Although the gatekeeper is not a required element in H.323, it can help H.323 networks to scale to a larger size by separating call control and management functions from the gateways.

H.323 specifications tend to be heavy handed and initially focused on LAN networking. Not surprisingly, the standard has some scalability shortcomings. One H.323 scalability issue is its dependency on TCP-based (connection-oriented) signaling. It is difficult to maintain large numbers of TCP sessions because of the greater overhead involved.

With each call initiated, a first TCP session is created using a first protocol defining a set of messages. A TCP connection is maintained throughout the duration of the call. A second session is established using another protocol. This TCP-based process allows an exchange of capabilities, master-slave determination, and the establishment and release of media streams.

The H.323 quality of service (QoS) delivery mechanism of choice is the Resources Reservation Protocol (RSVP). This protocol does not have good scaling properties due to its focus and management of individual application traffic flows. For these and other reasons, H.323 has historically been deemed ill-suited for service provider applications, and has been relegated to enterprise VoIP applications.

Real-Time Transport Protocol (RTP)

The RTP protocol provides end-to-end delivery services for data with real-time characteristics, such as interactive audio and video. Services include payload type identification, sequence numbering, time stamping, and delivery monitoring. Further, the RTP protocol provides features for real-time applications, including timing reconstruction, loss detection, content delivery, and identification of encoding schemes. Many media gateways that digitize voice applications use RTP to deliver the voice traffic. For each session participant, a particular pair of destination IP addresses define the session in order to facilitate a single RTP session for each call.

RTP is an application service built on UDP, so it is connectionless with best-effort delivery. Although RTP is connectionless, it does have a sequencing system that allows for the detection of missing packets. As part of its specification, the RTP identifies the encoding scheme used by the media gateway to digitize voice content. With different types of encoding schemes and packet creation rates, RTP packets can vary in size and interval. The combined parameters of a RTP session dictate how much bandwidth is consumed by the voice bearer traffic. RTP transporting voice traffic is the single biggest data contributor to conventional VoIP traffic.

Media Gateway Control Protocol (MGCP)

The MGCP (like its predecessor SGCP) largely defines the contemporary softswitch architecture. It is a master-slave control protocol the coordinates the action of media gateways. In effect, the MGCP divides the functional role of traditional voice switches between the media gateway and the media gateway controller.

In MGCP nomenclature, the media gateway controller is often referred to as a "call agent." The call agent manages the call-related signaling control intelligence, while the media gateway informs the call agent of service events. The call agent instructs the media gateway to setup and tear-down connections when calls are generated. In most cases, the call agent informs the media gateway to start an RTP session between two endpoints.

As one might imagine, the control and response sequence orchestrated by the MGCP between the media gateway and the call agent requires a substantial quantity of call state data to be stored at both the media gateway and call agent. The signaling exchanges between call agent and media gateway are accomplished by structured messages inside UDP packets. The call agent and media gateways typically have retransmission facilities for these messages, but the MGCP itself is stateless. Hence, a lost message is timed out by the VoIP components, as compared with a TCP delivery mechanism where the protocol attempts to retransmit a lost packet. Accordingly, MGCP messages are usually given very high priority in the VoIP network over other non-real-time data packets.

A number of routine MGCP functions executed during a call will be described in relation to FIG. 4. A call begins when a user picks up the origination phone 10 and dials a destination number. The media gateway 11 then notifies the media gateway controller (call agent) 12 that a call is incoming. The media gateway controller 12 looks up the dialed phone number and directs the media gateways to create a RTP connection (i.e., it identifies an IP address and port number). Media gateway controller 12 also informs the destination media gateway 13 of the incoming call, and the destination phone 14 rings. Thereafter, media gateways 11 and 13 open an RTP session across the IP network 15 when destination phone 14 is answered.

Session Initiation Protocol (SIP)

SIP is part of the IETF's multimedia data and control protocol framework. SIP is a powerful client-server signaling protocol used in VoIP networks. SIP handles the setup and tear down of multimedia sessions. Such sessions may include multimedia conferences, telephone calls, and multimedia content deliveries.

SIP is a text-based signaling protocol transported using either TCP (transmission control protocol) or UDP (user datagram protocol). SIP is relatively simple, efficient, and extendable, owing much of its design philosophy and architecture to the Hypertext Transfer Protocol (HTTP) and Simple Mail Transfer Protocol (SMTP). Thus, SIP uses invitations to create Session Description Protocol (SDP) messages to carry out capability exchange and setup call control channel use. Such invitations allow "participants" to agree on a set of compatible media types.

SIP supports user mobility by proxying and redirecting requests to the user's current location. Users may inform the server of their current location (an IP address or URL by sending a registration message to a registrar. Such a capability is increasingly attractive given a large and growing base of mobile users. With its mobile features, SIP implementations tend to be more discrete and SIP clients tend to be larger in number and more geographically distributed. Hence, one of the great challenges to implementing SIP services is mapping CoS delivery for the signaling and bearer traffic.

BRIEF SUMMARY OF THE INVENTION

The PSTN was designed decades ago. Its infrastructure costs too much and is not capable of delivering the telecommunication services demanded by today's customers. That is, Digital Loop Carriers (DLCs) and CLASS 5 Switches were designed to deliver narrow-band voice using TDM technology. Today's customers expect data, streaming audio and video, and sophisticated features in addition to basic voice service. TDM equipment simple can not support the modem packet-based transmission technologies required to provide these services.

Unfortunately, the capital investment made by service providers in the PSTN is immense. Thus, it is reasonable to expect that large portions of the PSTN will remain in use, at least in some form, for many years to come. VoIP networks must therefore continue to address the issue of integration with the PSTN. Stated another way, successful VoIP architectures must inter-operate with the PSTN, yet provide a clear migration path away from conventional PSTN components to evolving VoIP components.

The present invention provides just such an architecture. Within the dictates of the present invention, distributed packet technology enables the deployment of new, high-margin services to customers. Yet, it also allows VoIP components to be added to existing networks incrementally and transparently. The present invention provides a completely transparent bridge between a VoIP network and the PSTN. That is, a user originating a call on the PSTN will not perceive in any manner that the call was actually carried by a VoIP network. Similarly, a user originating a call through a media gateway will not perceive that the called party is accessed by the PSTN.

This objective is achieved by the present invention in the provision of a signaling gateway that functions on a transaction-by-transaction basis, and in the provision of a competent access switch more rationally defined in functional relation to the signaling gateway. In contrast, conventional VoIP components implement signaling on a call-by-call basis. Because of the call-by-call signaling approach taken and with the historic functional boundaries established between conventional VoIP components, session data is inefficiently stored and utilized.

Several technologies have recently converged to enable the VoIP architecture provided by the present invention. First, the ability to translate a variety of subscriber interfaces, including analog voice, into packet streams using Digital Signal Processing (DSP) has matured to the point where DSP hardware and software are available as reasonably priced commodities. Second, support for Quality of Service (QoS) in the transport of delay sensitive traffic, like voice and video, is available in many contemporary network components. Third, a new signaling protocol, SIP, has been developed which addresses the needs of the PSTN and efficiently facilitates the implementation of new services enabled by new, high-bandwidth transport networks.

Utilizing the capabilities of these enabling technologies, the present invention addresses the concept of media translation, generalizes it in a novel fashion, and solves the lingering problem of session state management that has to date precluded the cost-effective scaling up of VoIP (softswitch-based) architectures.

The novel media translation concepts underlying aspects of the present invention result in a new partitioning of session state between VoIP components. In brief and expressed in terms of conventional components, the present invention "pushes" session state from a signaling gateway (historically a media gateway controller) into an access switch (historically a media gateway). The quantity and character of the session state being pushed from media gateway controller to media gateway will vary by equipment vendor.

In part, it is the transfer of session state from signaling gateway component to access switch component that allows the functional state machine of signaling gateways included within VoIP networks designed according to the present invention to operate on a transaction-by-transaction basis, rather than a call-by-call basis. A "transaction" is broadly defined as including at least call setup, call tear-down, and all feature invocations. This approach to session state storage and management within a single access switch component also allows VoIP networks designed according to the present invention to be readily scaleable and beneficially susceptible to the introduction of new features.

DETAILED DESCRIPTION OF THE PRESENTLY PREFERRED EMBODIMENTS OF THE INVENTION

Figure 1:
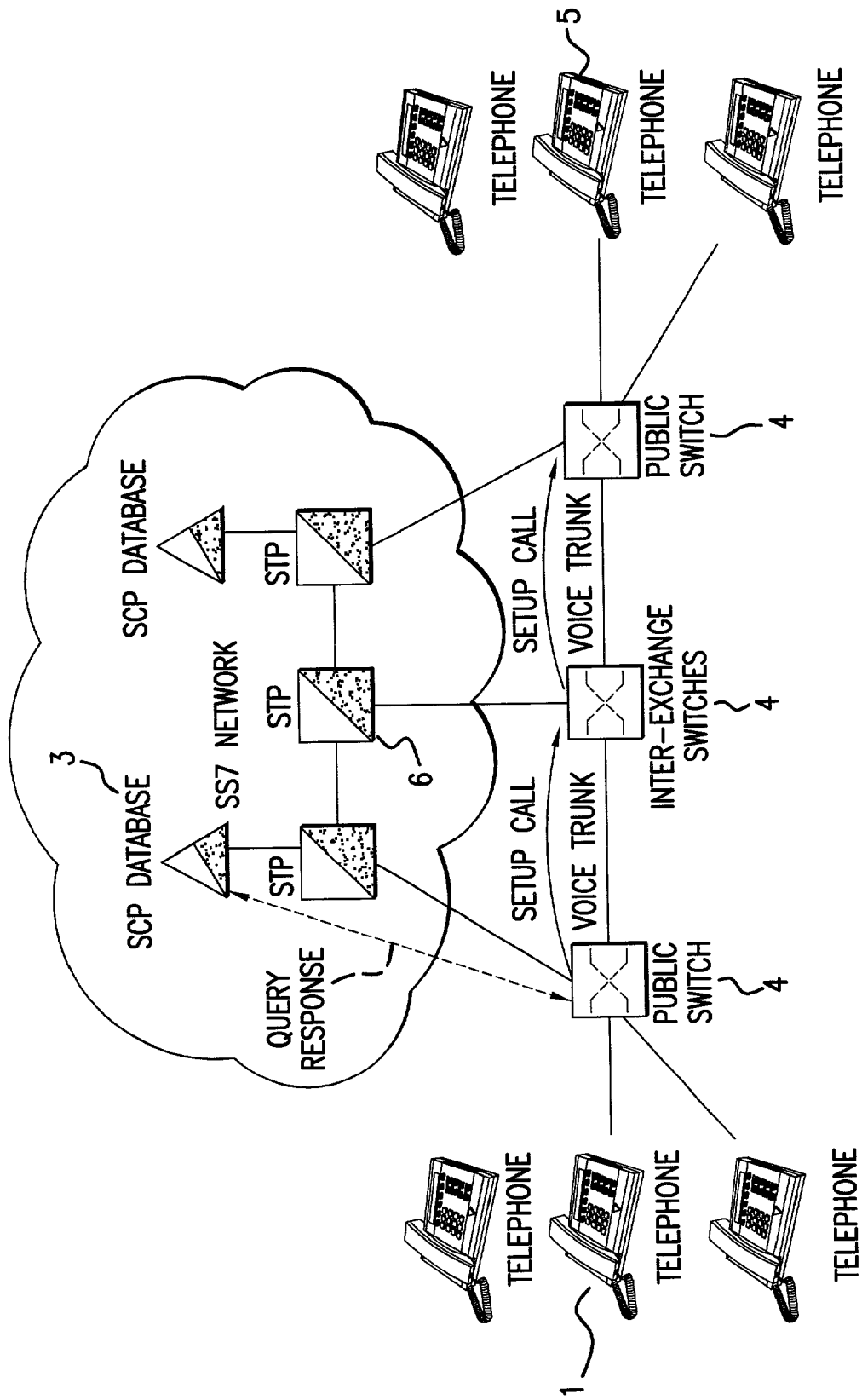
FIG. 1 is a conceptual illustration of major components forming the public switched telephone network (PSTN)
Figure 2:
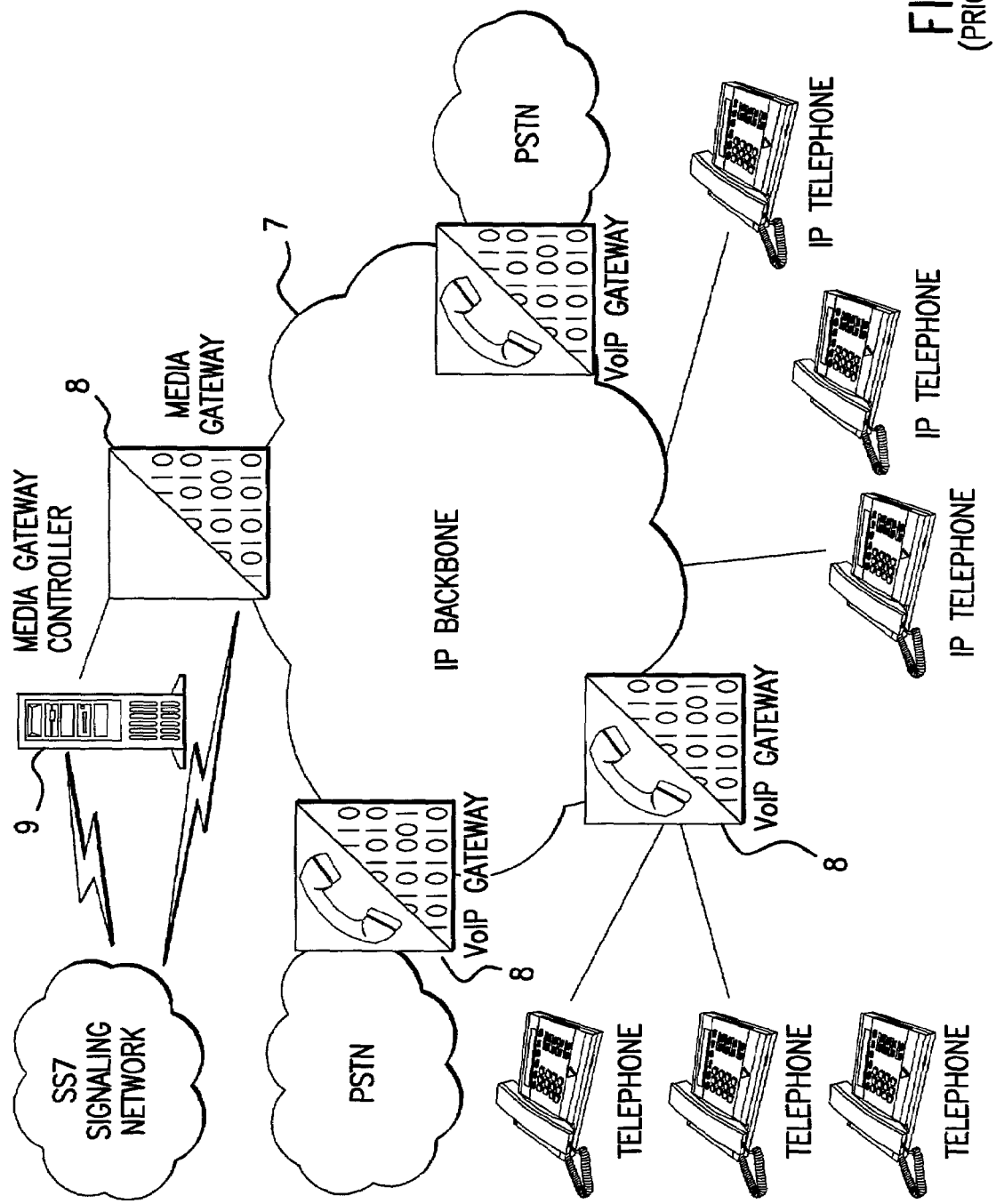
FIG. 2 is conceptual illustration of major components forming a conventional Voice over Internet Protocol (VoIP) network.
Figure 3:
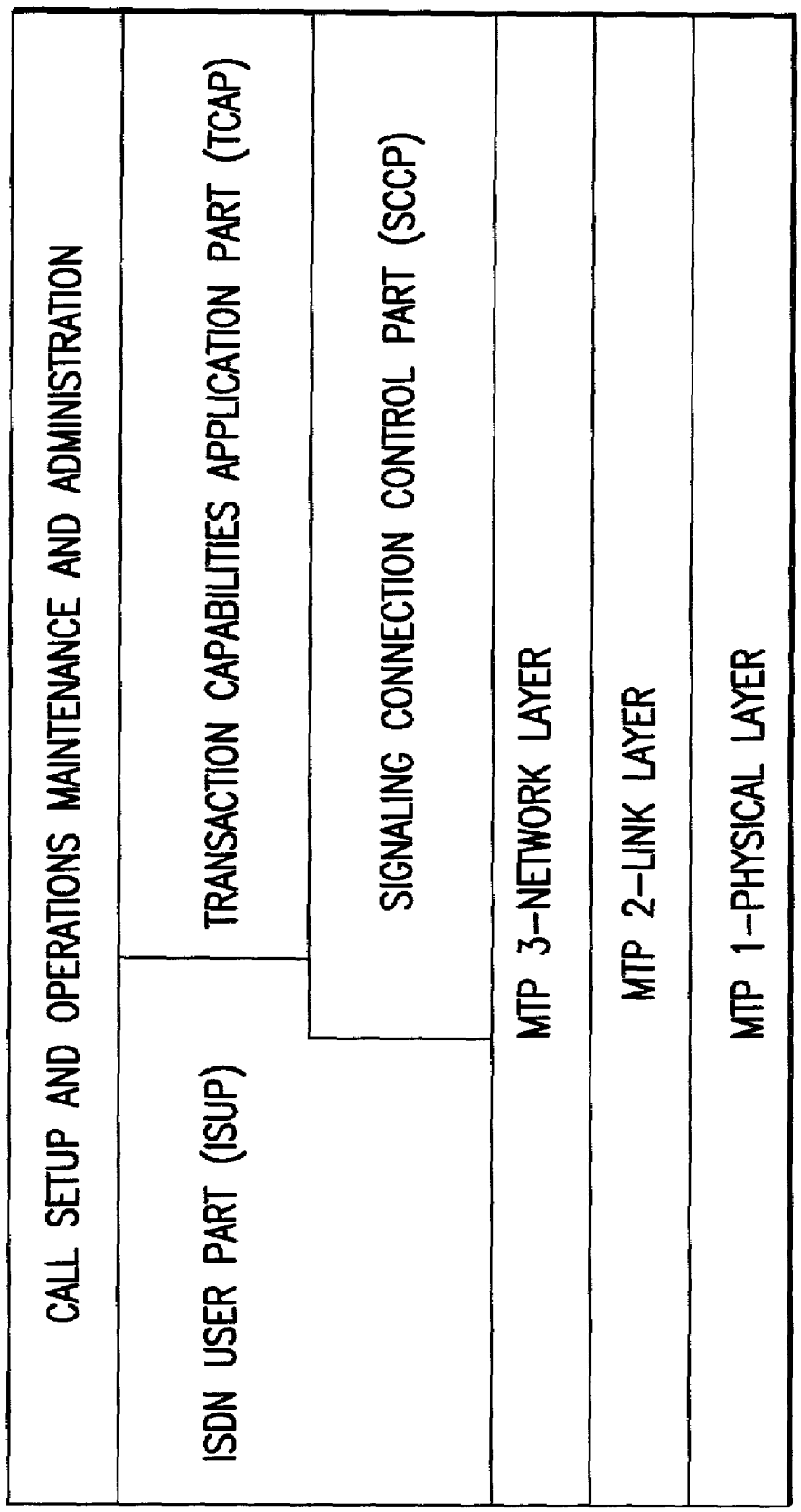
FIG. 3 illustrates the elements of the Signaling System Seven.
Figure 4:
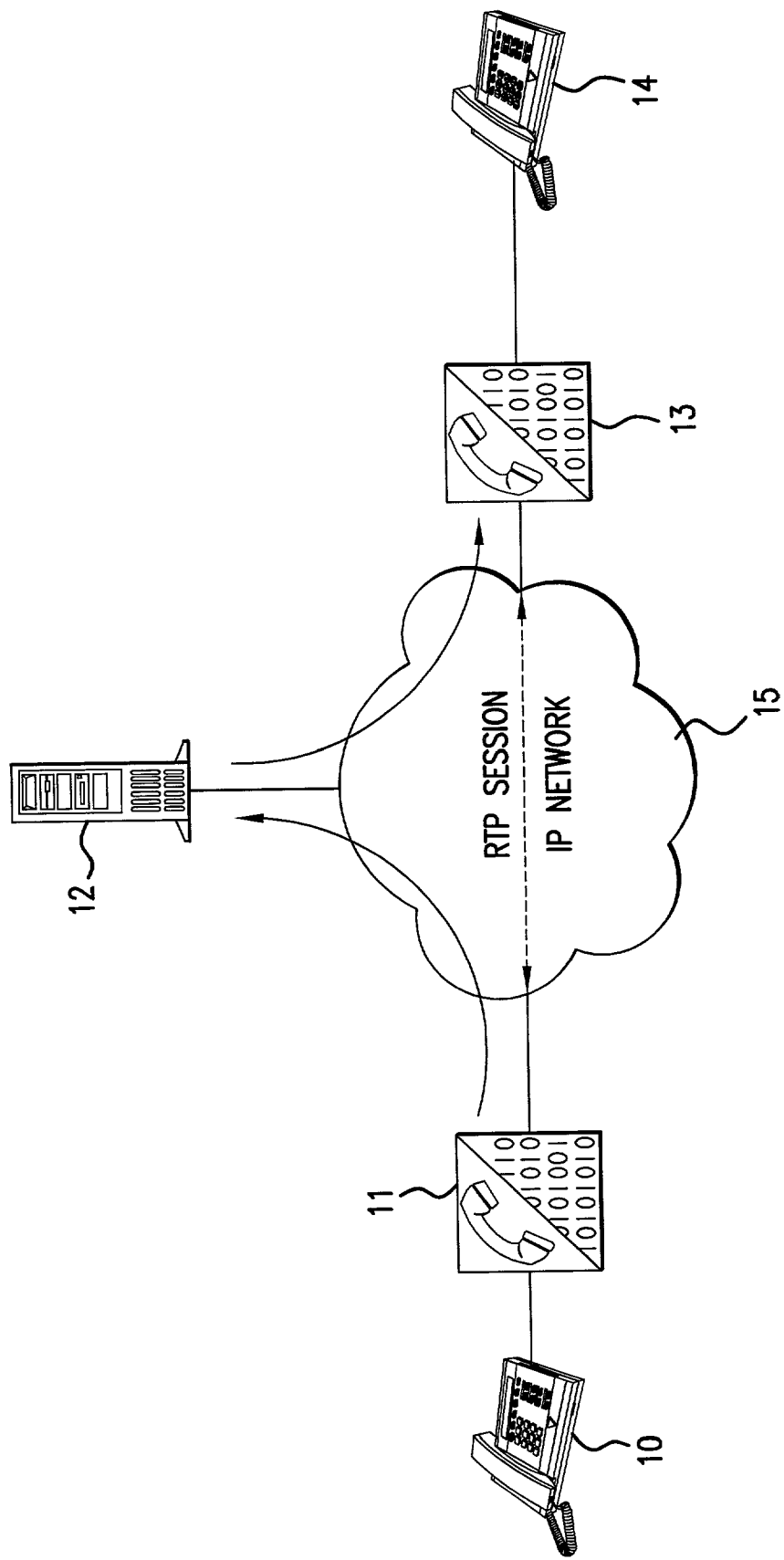
FIG. 4 illustrates functional relationships between a conventional media gateway and media gateway controller.
Figure 5:
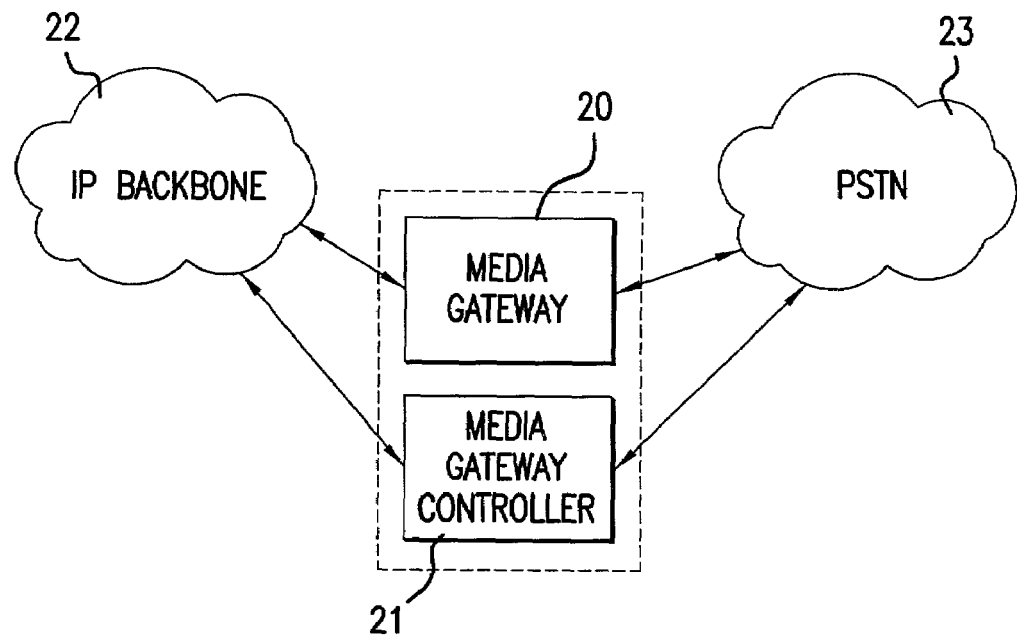
FIG. 5 illustrates the role of a conventional media gateway and media gateway controller in bridging an IP network and the PSTN.

Conventional VoIP architectures are largely based on two elements, the Media Gateway Controller (MGC), sometimes referred to as a softswitch, and the Media Gateway (MG), also referred to as a trunking gateway. FIG. 5 illustrates the relationship of Media Gateway 20 and the Media Gateway Controller 21 as components bridging a VoIP network 22 and the PSTN 23. The functional roles of these two components have previously been described. In short, the combination of a MG and a MGC can be used to move packetized payload and signaling data between VoIP network 22 and PSTN 23. Media Gateway 20 can be used to convert packetized voice data into TDM voice for transmission over the PSTN. Media Gateway Controller 21 can be used both to control operation of Media Gateway 20 and inter-operate with the signaling components of the PSTN.

Unfortunately, the conventional combination of a MG and a MGC suffers from a number of difficulties, including poor (or weak) signaling protocols, and scaling limitations associated with the basic architecture and functional partitioning between the elements. Most MGCs are designed to interface with their MGs using hierarchal protocols like MGCP and SGCP. These "hierarchical" protocols have been briefly described above and are quite specialized in their application. They compare very unfavorably with "peer-to-peer" protocols like SIP in that they are difficult to generalized and not readily adaptable to the control of components other than conventional MGs. Further, the legacy equipment-driven architecture that defines the MGC/MG functional boundary is inherently wasteful. Since a substantial duplication of session state is found in both the MGC and MG, hardware resources are inefficiently utilized. These two factors greatly limit the usefulness of conventional VoIP components in the deployment of new voice services and features.

Figure 6:
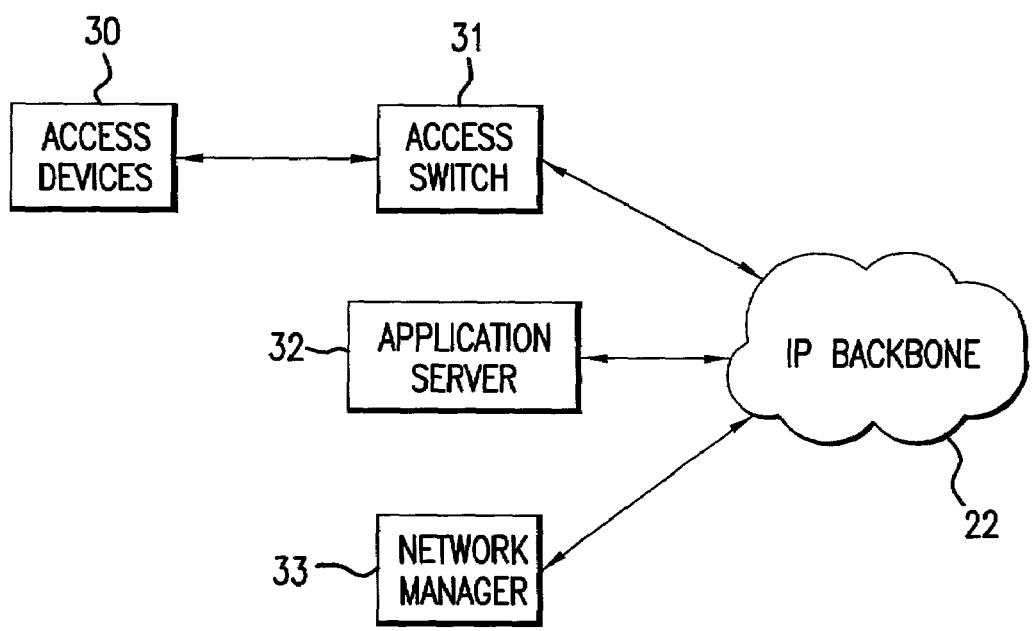
FIG. 6 is a conceptual illustration of one embodiment of a VoIP network according to the present invention.

In one aspect, the present invention overcomes these limiting factors by providing a readily scaleable architecture, along with enabling components and methodologies, that are easily adapted to the implementation of new voice features and services. FIG. 6 conceptually illustrates one embodiment of this new VoIP architecture. The integration of this VoIP network with existing networks, like the PSTN, will be described later.

As illustrated in FIG. 6, the present invention proposes a VoIP architecture comprising access devices 30, access switches 31, application servers 32, and at least one network manager 33 connected to the IP backbone 22.

Access devices can be any device capable of receiving and/or transmitting communications. They can be as simple as a traditional telephone connected via a twisted line pair, or as complex as a personal computer with a broadband connection or high-resolution television. Additional examples of access devices 30 include cell phones, Internet phones, computers and workstations, Personal Digital Assistants (PDAs), and portable audio playback devices such as MP3 players. Architecturally, access devices may be generally viewed as devices focused on one or more specific user application(s), e.g., voice, data, or video. Interfacing is the primary communications function associated with these access devices. Integrated Access Devices (IADs) are also contemplated in the term "access device(s)." IADs collect several individual subscriber interfaces for transmission via an aggregate trunk interface. For purposes of the present invention, the IAD trunk uplink is treated similarly to any other individual access interface. Similarly, the proposed access switch is capable of connecting many types of trunking interfaces as if they were an access device. Such trunking interfaces include Cable Television (CATV) systems, and wireless telephone and data interfaces, including the newer 2.5 G and 3 G elements.

As presently preferred, the IP Backbone 22 shown in FIG. 6 is an IP/MPLS (Multi-Protocol Label Switching) core. IP/MPLS routers provide the implementation of core network data transport. These conventional elements represent a mature packet transport infrastructure. IP/MPLS routers are assumed to provide high-sped transport only. They lack any notion of session state. A primary requirement for the IP/MPLS routers is the support of QoS. When IP is used without MPLS, the IP Type-of-Service (TOS) or Differentiated Services priority field may be used to provide multiple Classes of Service (CoS). Service Level Agreement (SLA) QoS becomes easier when MPLS and Virtual Private Network (VPN) technology are added. Obviously, there are numerous options available to those of ordinary skill in the art selecting a particular IP backbone, but the use of IP/MPLS is presently preferred since carriers are investing immense resources to further build out IP/MPLS based data transport networks.

The component shown in FIG. 6 as Application Server 32 represents a broad class of conventional devices and systems that provide content. "Content" can be any type of electronic media, including but not limited to audio, video, email and voice mail. The present invention allows for all types of content and application servers.

The Network Manager component 33 shown in FIG. 6 conceptually represents one or more mechanisms or systems by which all other elements in the VoIP network are controlled. In effect, network management component 33 provides a window into the operation of the overall network.

More specifically, the network management component preferred by the present invention provides a variety of services including configuration, provisioning, traffic engineering, and billing support. It must inter-operate with a carrier's existing Operations Support System (OSS). The present invention contemplates the use of one or more open standards such as SNMP, COBRA, and TL/1 in cooperation with access switch 31 and a signaling gateway (described below). The network management component preferably provides an intuitive, graphical interface allowing quick appraisal and manipulation of the network elements. Those of ordinary skill in the art are well acquainted with a broad class of conventional technologies and vendors providing network management tools and systems. Since the architecture proposed by the present invention consists of many small switching elements an associated network management component should be easily scaleable.

The design and functional operation of access switch 31 are important aspects within the architecture proposed by the present invention. Access device 31 provides at least access device termination, session state maintenance, and packet switching capabilities to the VoIP network. Access switch 31 is expected to implement an interface for each connected access device 30. Given the number, breadth, and ever growing nature of potential access devices this requirement may appear daunting at first glance. However, the ongoing development of standard interfaces and the modular nature of the access switch, described hereafter, greatly simplify this effort.

Access switch 31 maintains session state associated with terminating sessions being carried over subscriber interfaces. The term "subscriber interface" means any reasonable connection between an access device, integrated access device, or trunking interface and the access switch. In the context of a voice call, the term "session state" includes at least call state and call control information. Unlike conventional VoIP elements, the access switch according to the present invention is adapted to maintain all session state. The combination of access device termination and session state maintenance within a single network component provides a natural environment for feature and service implementation. Feature implementation may be readily performed in its entirety at the access switch, since a complete record of session state is available. Integration of packet switching and QoS support allows deterministic and flexible content support.

The access switch described by the present invention addresses most of the complexity associated with handling communications in the proposed VoIP architecture. By pushing complexity into the access switch, a component operating at the very edge of the VoIP network, the present invention enhances overall network reliability by reducing the density of each individual component. Scalability is further enhanced since the amount of work required of the network core is reduced. Additionally, feature and service creation can be readily monitored and maintained by the carrier. Thus, the location of system complexity and feature definition capabilities in peripherally located access switches provides greater system security and frees system subscribers from the need to handle of day-to-day configuration details.

Figure 7:
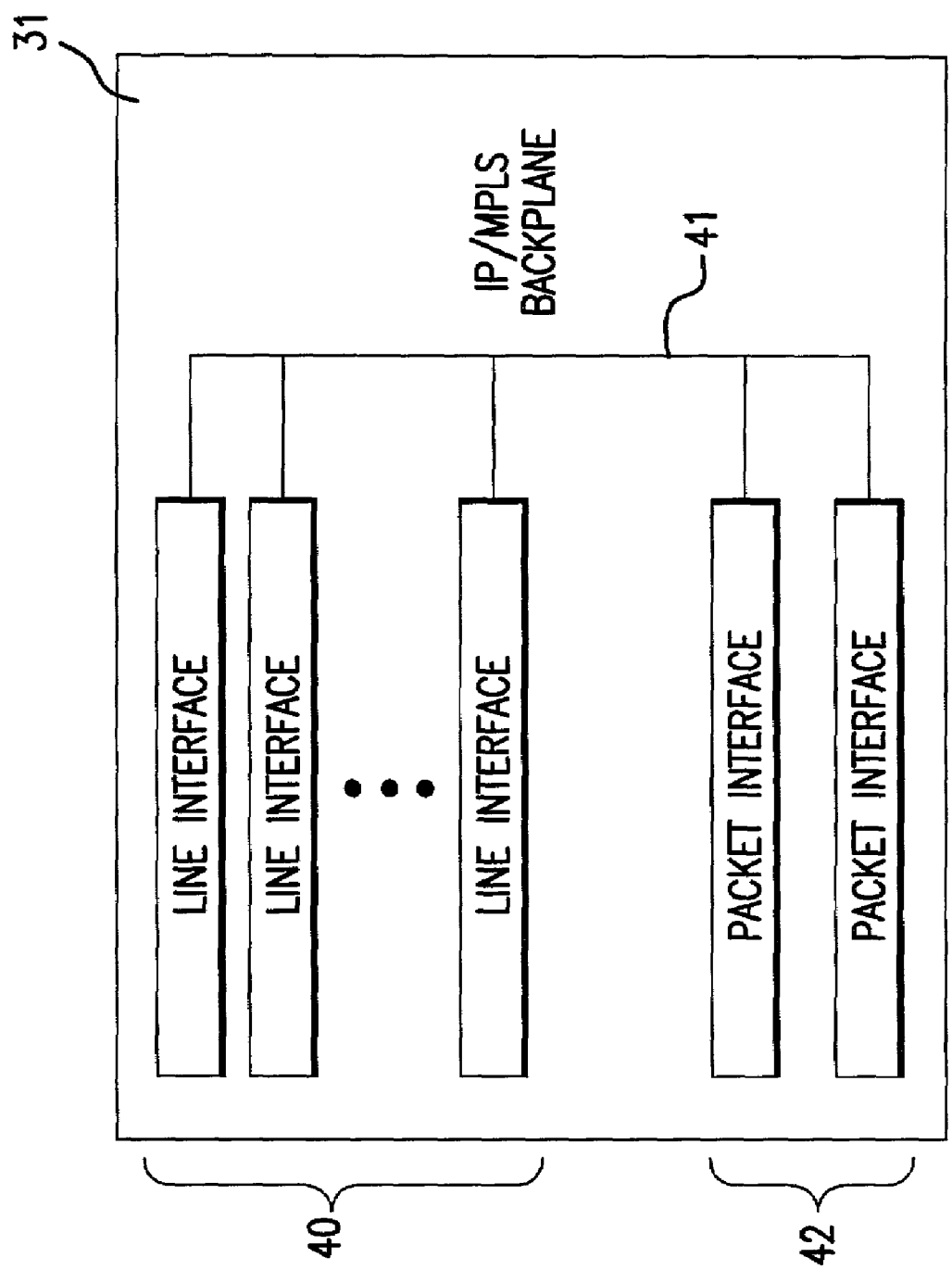
FIG. 7 is block diagram illustrating the access switch shown in FIG. 6 is some additional detail.

FIG. 7 is a block diagram showing one presently preferred embodiment of access switch 31 is some additional detail. In this embodiment, access switch 31 comprises one or more line interface cards 40 that "terminate" access devices and maintain session state, an IP/MPLS backplane 41 allowing packet switching between the access switch elements, and packet interface cards 42 that perform routing and forwarding between the IP/MPLS trunk interfaces. The packet interface cards may be redundantly provided. The development of line interface cards and definition of data packetization in relation to specific subscriber interfaces and access devices is deemed an exercise in ordinary skill. The specific definition of the packet interface cards is similarly deemed ordinary. Many approaches to the definition and implementation of a high bandwidth backplane will be successful within the context of the present invention. Because high bandwidth IP/MPLS transport is used across its backplane, access switch 31 is readily able to accept future subscriber interfaces by simply adding new line interface cards into the existing chassis.

As presently preferred, the standard, rack-mounted chassis used to house access switch 31 contains no common equipment. Rather, all of the functions traditionally associated with common equipment are distributed onto line interface cards 40 and packet interface cards 42. Such an approach provides lower entry cost for the access switch and allows it to be used in low density installations at cost points similar to those of high density installations.

While TDM and ATM are in prevalent use by conventional network equipment, IP and MPLS based packet switching equipment will dominate the networks of the future. The access switch must be capable of switching packet data onto a carrier's network regardless of the data transmission scheme being used. One principle challenge in this context is maintaining QoS for packets carrying data associated with time-sensitive applications, like voice and video. The access switch according to the present invention distributes packet switching across both line interface and packet interface cards. Data transmission between the line and packet interfaces occurs at line speed. Thus, no store-and-forward buffering is used until packets arrive at the packet interface card. Since no congestion can occur prior up to the packet interface card, QoS implementations can be localized. Using Differentiated Services (Dissserv) in conjunction with the proposed access switch allows a carrier to provide up to eight classes of packet transport service to and from a trunking interface.

As presently contemplated, the access switch is preferably connected to a VoIP network supporting IP/MLS bearer transport and SIP signaling. It is fully expected that SIP will evolve over time and will almost certainly be replaced in practice by some yet to be defined protocol. While use of SIP is presently preferred, those of ordinary skill in the art will understand that the present invention contemplates use of any expressive, peer-to-peer protocol over an IP network. Thus, in one aspect, the present invention may be characterized as using a selected peer-to-peer protocol to facilitate transparent cross network exchanges between IP networks and non-IP networks, such as the PSTN or an H.323 zone.

As already noted, a primary function of the proposed access switch is the termination of access devices. Access devices are terminated via one or more subscriber interfaces. The term "terminate" or "termination" means translating both the payload data and signaling (if any) associated with a subscriber interface into a common representation used for transport via a VoIP network. A primary advantage of terminating a subscriber interface at an access switch is flexibility. The access switch can be designed to terminate a variety of different subscriber interface types, thereby allowing a carrier to service a variety of customers using a single network component.

In the presently preferred embodiment, as illustrated in FIG. 7, access device termination is accomplished by individual line interface cards 40. Since line interface cards 40 are removable and replaceable, the access switch may be readily adapted to different subscriber interfaces. A variety of line interface cards 40 terminating local telephone carriers have been developed including; a 32-port Asymmetric Digital Subscriber Line (ADSL)/Plain-Old Telephone Service (POTS) line interface card and a 16-port T-1 line interface card. In presently preferred line interface cards, all of the POTS voice data is encoded using one of a variety of DSP CODECS, including G.711, G.723, G.726, G.729. In addition, T.38 FAX and V.92 modems can be also be terminated. The ADSL line interface card may support both full and G.Lite implementations. The T-1 interfaces can be configured as both Channelized, supporting CAS, PRI, and TR-008 signaling and Un-Channelized, supporting Frame Relay service.

In addition to connecting to the IP backbone and terminating access devices, the access switch of the present invention is able to maintain all session state. Conventionally, session state is maintained by the MG and MCG during the entire session. For voice calls, session state must therefore be maintained from call setup, during call "hold time," until tear-down. Hold time is the period of time during which the voice conversation is carried out.

The access switch according to the present invention maintains all session state associated with a subscriber entirely on one or more line interface cards to which the subscriber interface is attached. Like the conventional combination of MG and MGC, session state is maintained on the access switch throughout the entire call. However, unlike conventional VoIP networks session state is maintained on a single component, not two separate components often manufactured by different vendors. Session state may include feature and services implementation, as desired. Consider, for example, certain features generally associated with a CLASS 5 switch, namely a calling name lookup associated with the display of caller ID information or local number portability initiated by call manager software on a line interface card associated with the specific subscriber interface. These features can be implemented in the access switch, thereby beneficially offloading the conventional narrow-band equipment.

The ability to maintain all session state on the access switch is a distinct difference between the VoIP architecture proposed by the present invention and conventional VoIP architectures. Maintaining all session state on the access switch eliminates the need for the conventional MGC. In conventional VoIP network architectures, most session state is maintained at the MGC which typically resides at a central office location. A major problem with conventional VoIP architectures and implementations is the fact that the MGC cannot maintain all session state in a single location, because the MG historically requires that some session state be stored in the MG. This requirement results in a detrimental duplication of session state information. While some benefit may be identified in centralizing large portions of session state, the cost associated with this advantage are very high due to the added burdens of redundantly storing session state data and maintaining coherency between session state data portions separately stored at the MG and MGC.

In addition, duplication of session state makes feature implementation more difficult. In most cases, conventional feature implementation requires some interaction between MG and MGC. In practice, the MG and MGC are often manufactured by different companies. This unfortunate reality requires a would-be feature designer to deal with multiple equipment vendors to order to define or redefine a feature. However, when all session state is stored in a single network component, as provided by the architecture proposed in the present invention, feature implementation is greatly simplified, both conceptually and in practice.

Session state maintenance is one principle driver for the VoIP architecture proposed by the present invention. The economic realities of equipment migration is another principle driver. As noted, any successful VoIP architecture must provide an efficient path for equipment migration while also providing effective integration with existing networks like the PSTN. Migration must be both incremental and transparent. The proposed architecture, along with its enabling system components and methodologies, provides these two capabilities.

Figure 8:
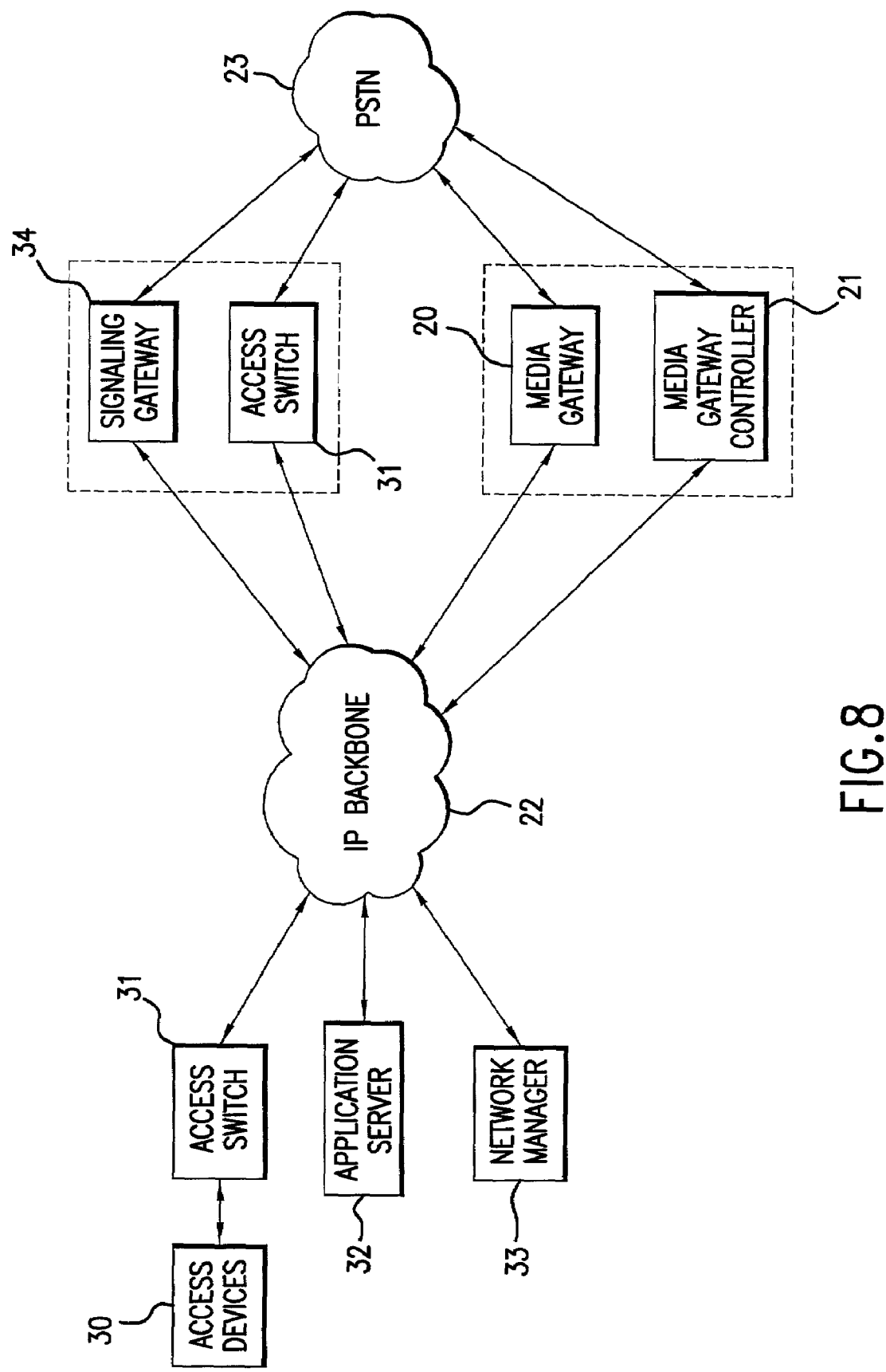
FIG. 8 conceptually illustrates the ability of a VoIP networked formed in accordance with the present invention to allow for incremental migration of existing networks.

The concept of transparent interoperability that underlies successful equipment migration is illustrated in the context of the present invention by the system schematic shown in FIG. 8. (Compare FIGS. 5 and 6, in which like elements are similarly numbered). Here, the combination of a signaling gateway 34 (described below) and access switch 31 is able to replace the conventional combination of media gateway 20 and media gateway controller 21. The combination of signaling gateway 34 and access switch 31 is not just a physical, one-for-one replacement for the conventional combination, but a combination allowing enhanced scalability of the proposed VoIP network at reduced cost.

The concepts underlying the design of signaling gateway 34 were developed in relation to the proposed access switch 31. For example, because access switch 31 maintains all session state, signaling gateway 34 need not maintain any session state. At most, signaling gateway 34 must maintain "transaction state" information during the very brief periods of time required to execute an associated transaction. While transaction state is sometimes considered a subset of session state, the two types of state data are considered distinct for purposes of the present description. Session state is all state typically persisting beyond the transaction periods. In contrast, transaction state is state existing in a signaling gateway only during the pendency of the transaction.

Signaling gateway 34 provides transparent translation between two signaling networks. In the context of the working example used thus far to illustrate the present invention, "transparency" allows a signaling gateway which provides the illusion that the SIP signaling network is an extension of the SS7 network, and vice versa. Thus, where access switch 31 is used to bridge two networks having different signaling environments, signaling gateway 34 becomes essential to transparency. On the other hand, it is the ability of access switch 31 to maintain all session state that allows signaling gateway 34 to operate in a stateless manner.

Figure 9:
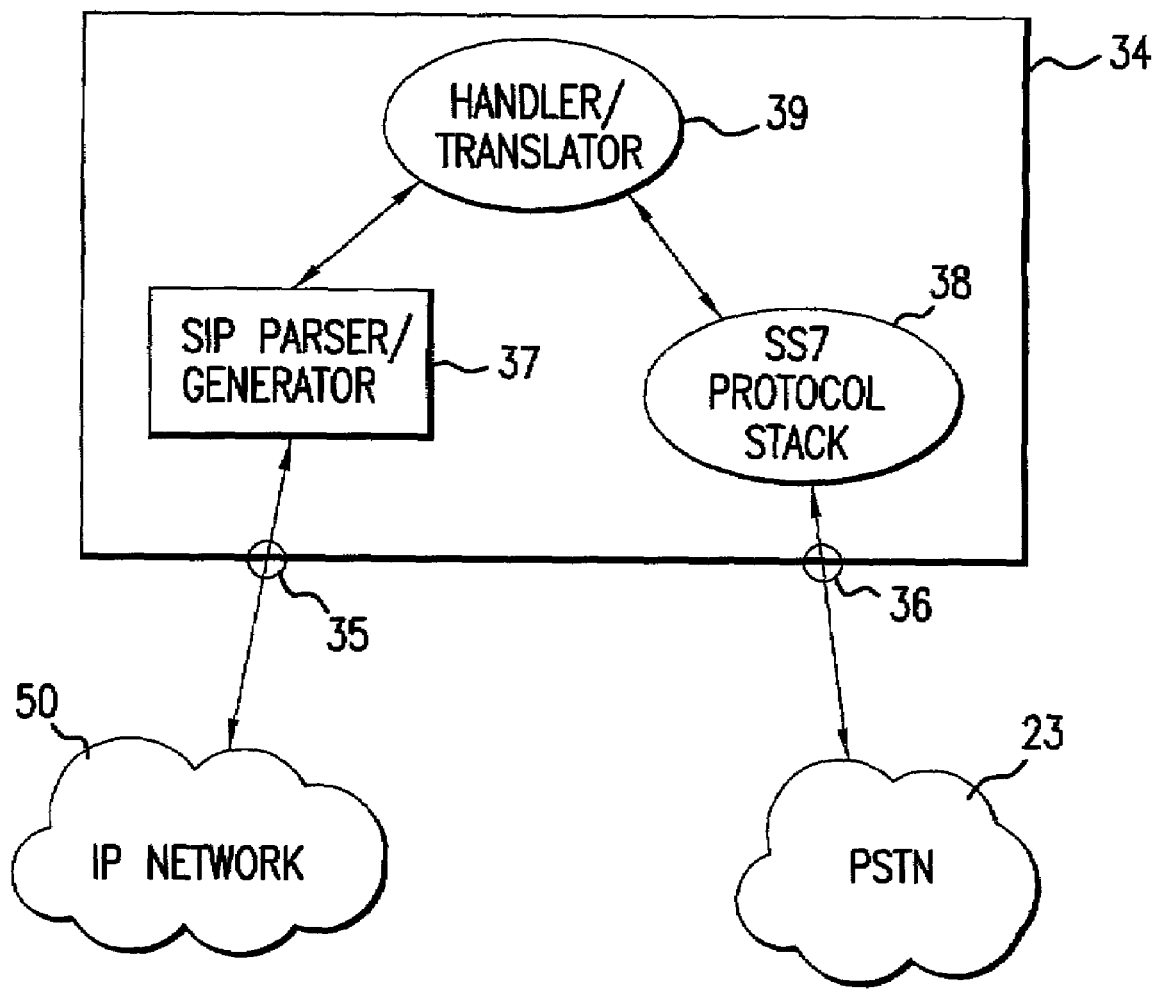
FIG. 9 further illustrates one embodiment of the signaling gateway component shown in FIG. 8.

FIG. 9 further illustrates one presently preferred embodiment of signaling gateway 34 in the context of bridging an IP network 50 using SIP with a non-IP network like the PSTN 23 which relies on the SS7 network for signaling. At a first port 35 (which may actually consist of numerous, separate data connections), SIP messages are sent and received from the IP network 50. At a second port 36 (again possibly formed by numerous, separate data connections), SS7 signaling messages are sent and received from the PSTN 23. SIP messages are generated and parsed by a SIP parser/generator 37. A conventional SIP message parser/generators (commercially available) may be used here. SS7 signaling messages are generated and decoded by a SS7 protocol stack 38. Again, one of several conventional devices may serve here. Commercially available SS7 protocol products maintain much of the state information used to establish the reliability and redundancy of the logical SS7 connection to the PSTN. Functionally connecting SIP parser/generator 37 and SS7 protocol stack 38 are SIP transaction handler and translator 39. These two elements are conceptually illustrated as one element since together they form the "glue" binding the SIP and SS7 networks together. The SIP transaction handler provides termination for the SIP branch of the signaling path. The translator provides a "simple" translation between SIP messages and analogous SS7 signaling messages. Three basic principles motivate the design and implementation of the signaling gateway and the translator central to its purpose. First, translation should occur by direct mapping of message types from one signaling network into messages types from the other signaling network, wherever possible. This so-called "direct translation" is desirable because it takes advantage of all natural mappings between the semantics of the two signaling networks. It also makes the translator as simple as possible. For example, there are numerous analogous signaling transactions in SIP and SS7, most specifically in the area of call setup and tear-down.

Second, the signaling gateway should be, functionally speaking, only a simple translator. In other words, if an exception (error) condition occurs, the signaling gateway does nothing to correct the condition. An indication of an exception is merely translated and passed through in exactly the same way as any normal signaling message. It is the responsibility of the signaling endpoints to handle exceptions. More robust system implementations are possible by allowing the signaling gateway to pass exceptions along without attempting to handle them. The signaling gateway thus avoids complexity and the need to observe state-based functionality requirements.

Third, in those situations where one signaling network is more "expressive" (i.e., has more functions) than the other signaling network, mechanisms (hardware and/or software) must be added to the less expressive signaling network to order to allow as much direct mapping as possible. Staying with the working example, some existing SS7 signaling messages do not directly map into SIP messages.

Adding mechanisms to one set of signaling representations in order to allow the mapping of a feature already present in one network to appear in another network can be difficult. Yet there are several approaches available to address this problem. One approach develops permanent additions to the set of signaling representations lacking a particular feature. In the presently preferred embodiment, new SIP messages can be added to the existing protocol. Alternatively, a generic transport message could be used with the protocol content contained in the SIP message body. This later approach is presently preferred. While the former approach has the advantages of forming high quality constructs in SIP to augment the existing message set, it also requires that all such messages be provided in every SIP implementations, which is clearly not necessary. The later approach has the advantage of decoupling PSTN specific functions from the generic SIP protocol, which has many additional uses beyond PSTN interoperability.

The translator resident in the signaling gateway performs message conversion on a transaction by transaction basis. As already noted, transactions include call setup, call teardown, and feature invocation. The translator element maintains a transaction control block (i.e., transaction state) for each transaction from only the time the transaction begins until the transaction is completed.

Maintaining minimal transaction state in the signaling gateway over the very brief period of time required to execute the transaction, rather than maintaining session sate during an entire call is important for two reasons. First, transactions are always shorter than a call, often vastly shorter. A typical transactions may last for a few hundred milliseconds. In contrast, a call may last hours. By briefly maintaining only transaction state, the signaling gateway makes much more efficient use of available resources. Second, error handling for signaling protocols tend to be based on errors occurring during a transaction. If session state is maintained between transactions, the signaling gateway must assume some responsibility for error handling outside of protocol definitions. This greatly complicates the design of the signaling gateway and its operation with the access switch. Historically, this complex interaction between the signaling element (an MGC) and the switching element (a MG) necessitated the development and use of a completely separate, master-slave protocol (MGCP). By only maintaining transaction state during transaction periods, the signaling gateway according to the present invention need not handle errors between call setup and teardown. In the present invention, this responsibility is passed in its entirety to the access switch which, maintaining all session state and being located at the periphery of the network, is much better suited to resolved such issues.

In addition to providing a signaling gateway capable of transparently translating messages between networks using different signaling schemes, signaling gateway 34 of FIG. 9 may be combined with a competent server. In the preferred embodiment, a full SIP server is contemplated. The SIP server may be a conventional, off-the-shelf device, but should include support for all, current, standard features including at least proxying, redirection, routing, and forking. The SIP servers (or SIP functionality) incorporated into the present invention is expected to conform with SIP standards, such as those set forth in Handley et al., RFC 2543, *Session Initiation Protocol* available through the IETF.

Conventional SIP servers include a parser receiving data from a buffered network connection. The parser assembles received data bits into complete SIP messages. Once assembled by the parser, complete messages are forwarded to a routing engine that routs the incoming messages according to several well understood criteria. Conventional SIP servers also include a generator receiving SIP messages in their internal representation, converting the internal representations into SIP message text, and transmitting the message text as a stream of data via a network connection.

Figure 10:
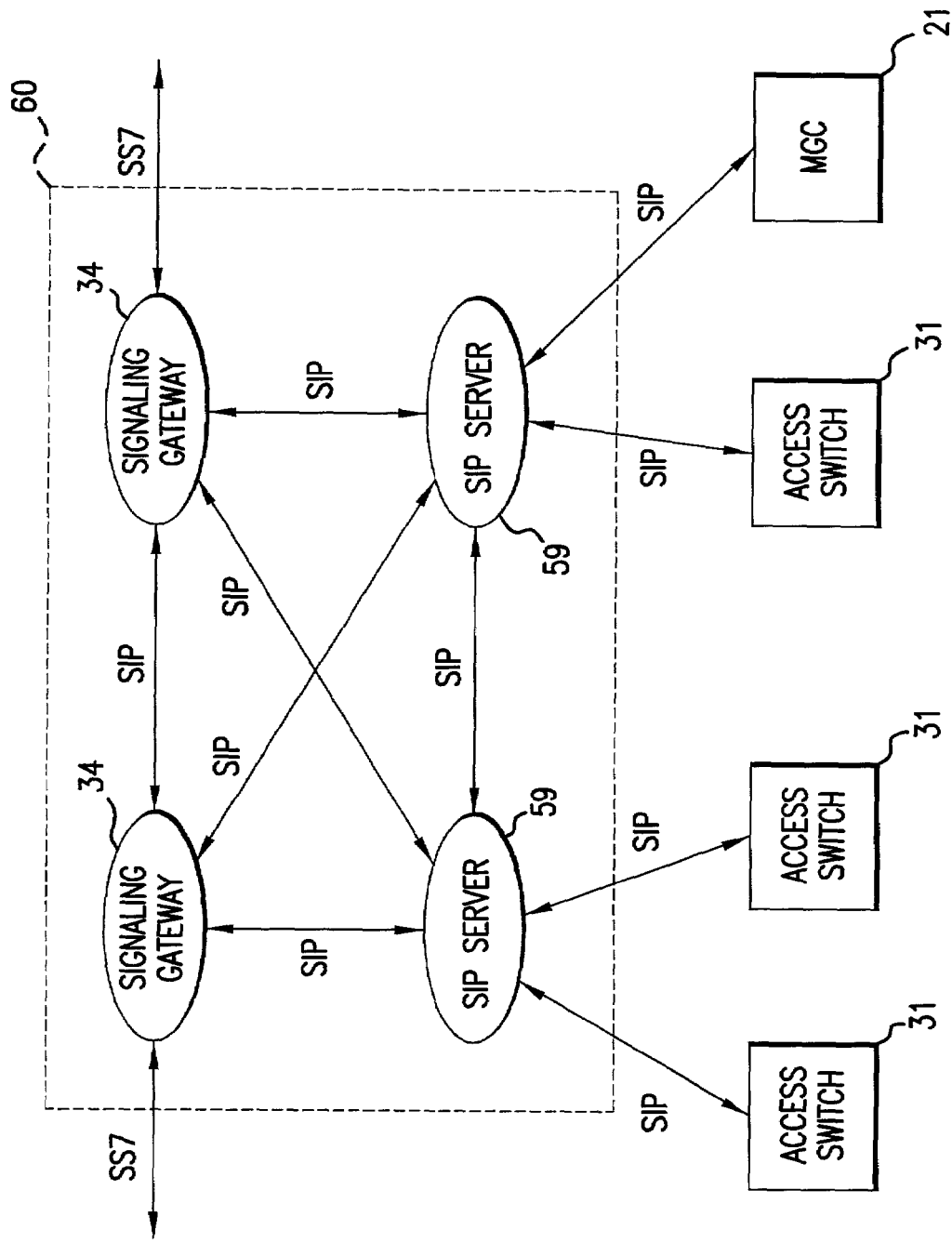
FIG. 10 further illustrates another embodiment of the signaling gateway component shown in FIG. 8.

A second embodiment of a signaling gateway 60 is illustrated in FIG. 10. Here, one or more signaling gateways 34, like the one described in relation to FIG. 9, are combined with one or more SIP servers 59. Each signaling gateway 34 communicates with the SS7 signaling network. Each SIP server communicates with one or more external devices, typically an access switch 31, but possibly other devices such as the conventional MGCs 21. The SIP servers 59 and signaling gateways 34 are preferably independent. This means each can execute on the same hardware platform or on separate hardware platforms. Multiple SIP servers 59 can interact with multiple signaling gateways 31. The use of SIP messages is presently specified for communication between the SIP server and signaling gateway elements. The use of a standard representation for these communications is desirable, but a more efficient representation may be used if performance dictates.

Continuing with the working example of bridging a SIP network and a SS7 network, a variety of signaling must pass between these two networks in order to connect a call. However, all of this signaling may be logically viewed as being in one of two classes: 1) call setup and tear-down, or 2) feature invocation. The parameters of the first class are well understood and fairly limited. The second class is more elastic and bound to change over time and in relation to the access devices being connected to associated access switches or MGCs. Not all feature invocations require signaling interactions across network boundaries. However, some features do, including as examples, local number portability, calling number delivery, calling name delivery, visual message waiting indication, stutter dial tone message waiting indication, abbreviated ring message waiting indication, calling identity delivery on call waiting, calling identity delivery blocking, call forwarding, and calling number delivery blocking. These exemplary features all require the use of TCAP to query SS7 SCPs.

Four possible signaling scenarios will be examined. The first is one where the calling subscriber and the called subscriber are both directly connected to respective access switches in the VoIP network. In this scenario, no SS7 signaling is required. Thus, no message translation is required. The connecting access switches function as if they were components in a conventional VoIP network. A signaling gateway of the sort shown in FIG. 10 might become involved in the call if an associated SIP server is used to proxy or redirect the call. In any event, this first scenario does not implicate the more novel aspects of the present invention.

Figure 11:
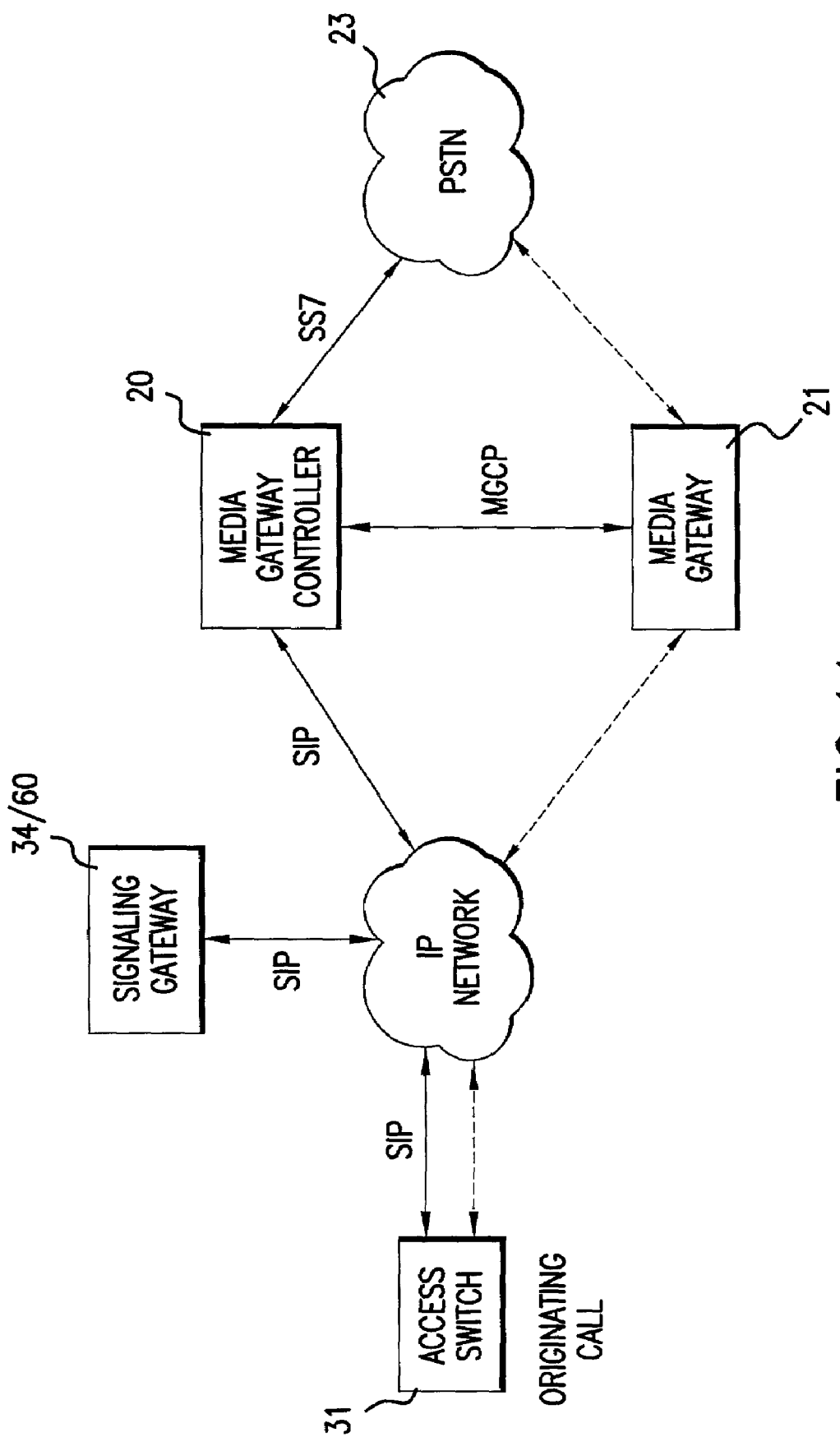
FIGS. 11 and 12 illustrate the flow of signaling messages in an exemplary scenario.

A second calling scenario is illustrated in FIG. 11. In this scenario, the calling subscriber is connected to an access switch 31 and the called subscriber is connected via a conventional media gateway 21. (In this example and several to follow the access switch 21 and signaling gateway 34/60 are shown as being physically separate. Clearly these two elements may, but need not be commonly located. The relationship of these components to the IP network and other connected networks is more relevant than physical proximity).

Figure 12:
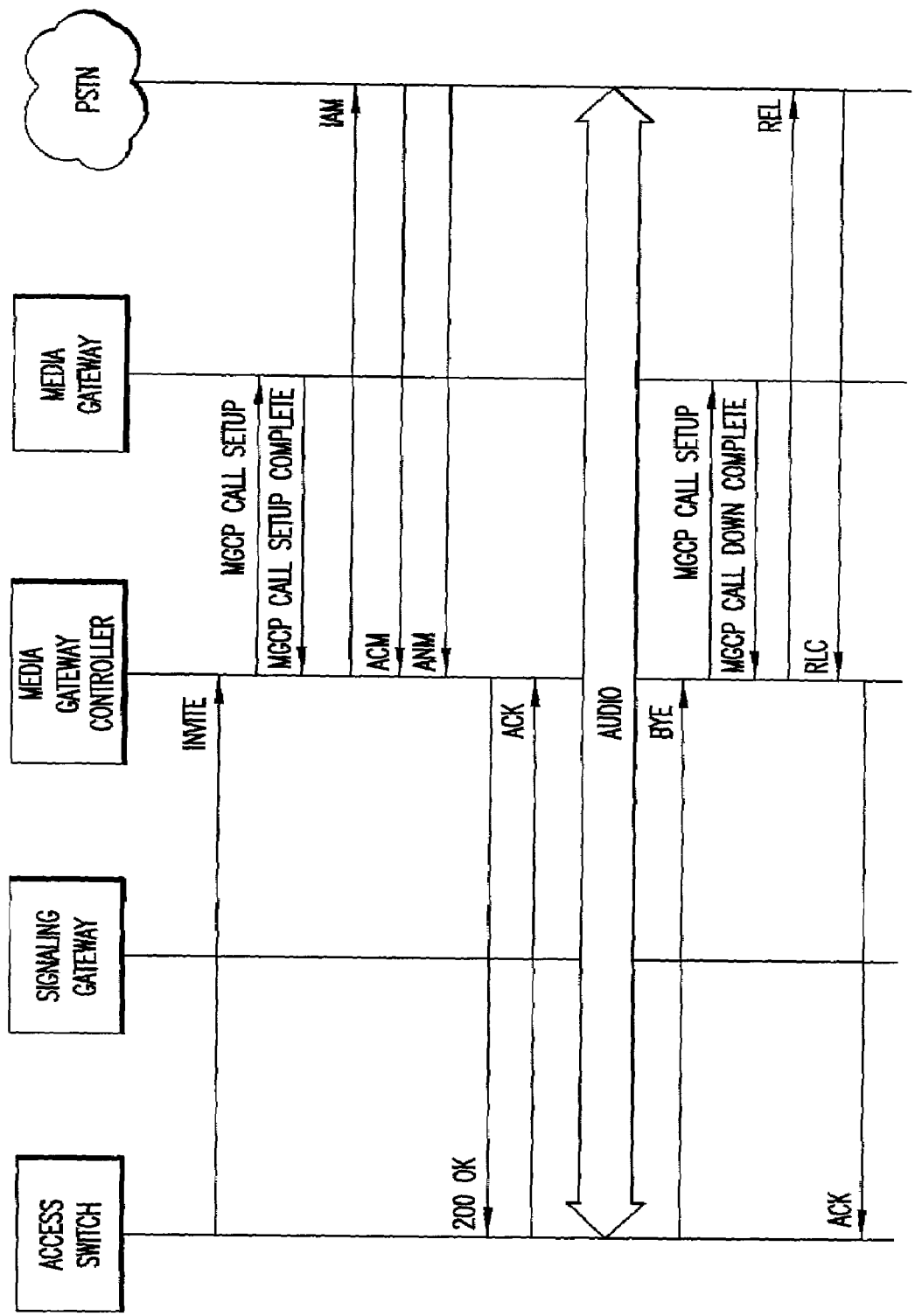

FIG. 12 illustrates the flow of signaling between the network components shown in FIG. 11 using a call setup and tear-down example. Of note, access switch 31 and signaling gateway 34 or 60, (as shown in FIGS. 9 and 10 respectively), are able to interact with the conventional combination of a MGC 20 and MG 21 across the IP network to effect transport of payload and signaling data. Upon call inception access switch 31 issues an INVITE signal to MGC 20. MGC 20 sets up the call on the MG using a protocol like MGCP. The MGC is also responsible for signaling the SS7 network. It issues an Initial Address Message ("IAM") and awaits an Address Completion Message ("ACM") and a subsequent Answer Message ("ANM") that indicate the PSTN leg of the call has been established. A 200 OK result is then returned to access switch 31 that then sends an ACK to the MGC 20. When the call is complete, access switch 31 issues a BYE to MGC 20, and MGC 20 tears down the call on MG 21 using MGCP. It also issues a REL signal to the SS7 network and awaits an RLC. When the RLC is returned, MGC 20 responds to access switch 31 with an ACK indicating the call has been torn down.

Figure 13:
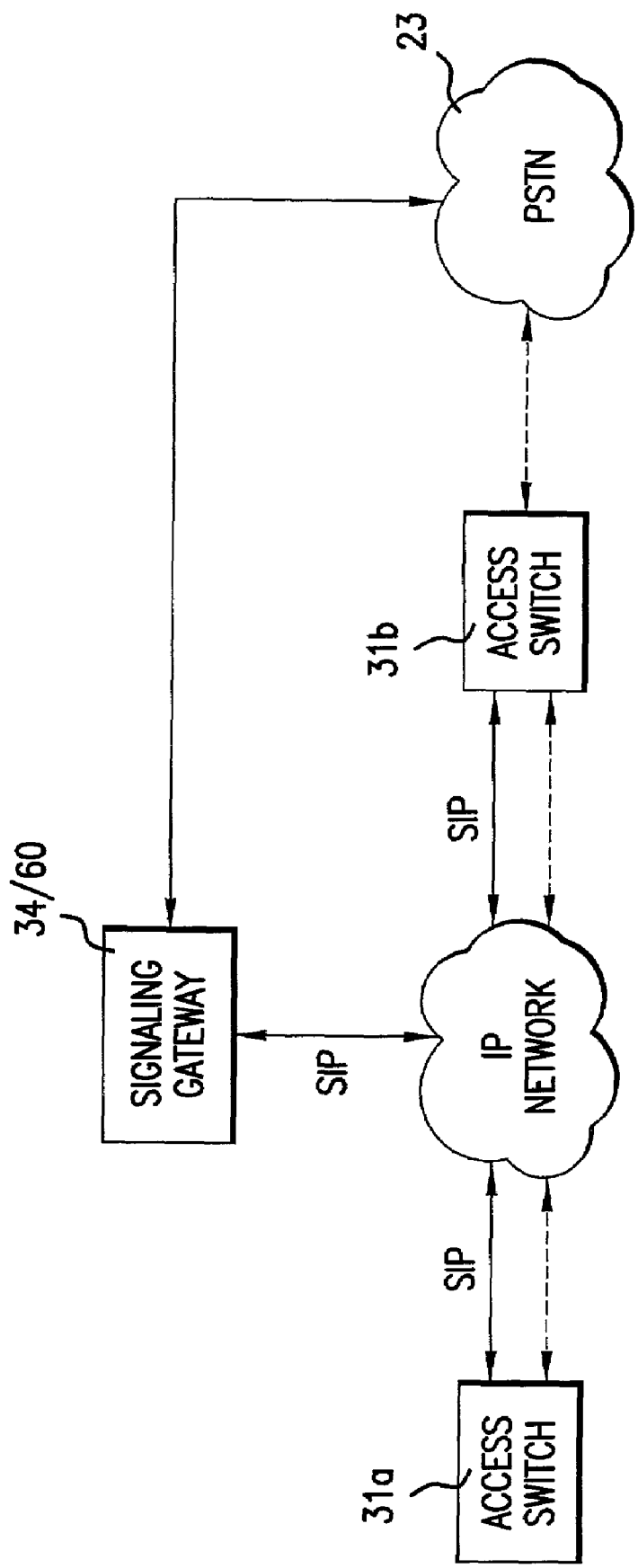
FIGS. 13 and 14 illustrate the flow of signaling messages in another exemplary scenario; and, FIGS. 15 and 16 illustrate the flow of signaling messages in yet another exemplary scenario.

FIG. 13 illustrates a third scenario in which both subscribers are connected to the IP network via access switches. However, in this scenario one subscriber is directly connected via a first access switch 31*a* and the other subscriber is connected via the PSTN 23 to a second access switch 31*b*, perhaps via a T-1 interface. Message translation become necessary.

Figure 14:
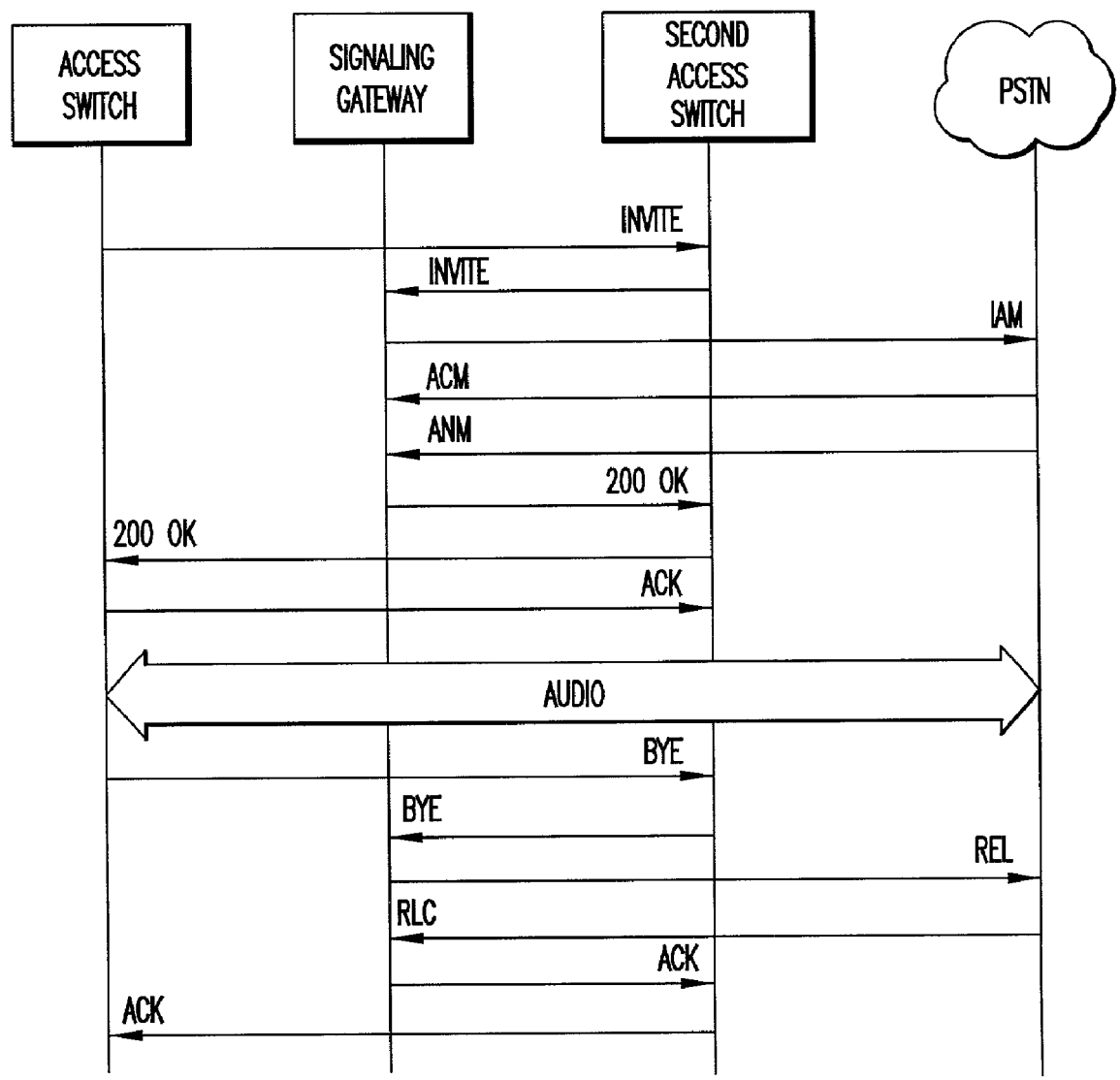

FIG. 14 illustrates the flow of signaling between the network components shown in FIG. 13 using a call setup and tear-down example. First access switch 31*a* issues an INVITE to second access switch 31*b*. Second access switch 31*b* allocates a T-1 channel and issues an INVITE to signaling gateway 34/60. Signaling gateway 34/60 translates the INVITE to an IAM and forwards it to the SS7 network. The SS7 network indicates the establishment of the PSTN leg of the call by returning an ACM and an ANM message to signaling gateway 34/60. (Some additional intervening message sequences that occur here on the SS7 side are omitted for the sake of clarity). When the PSTN leg of the call is completed, signaling gateway 34/60 issues a 300 OK to second access switch 31*b*. Then second access switch 31*b* sends a 200 OK to first access switch 31*a*. Call setup is complete when first access switch 31*a* sends an ACK to second access switch 31*b*. Call tear-down proceeds similarly as shown in FIG. 14.

Figure 15:
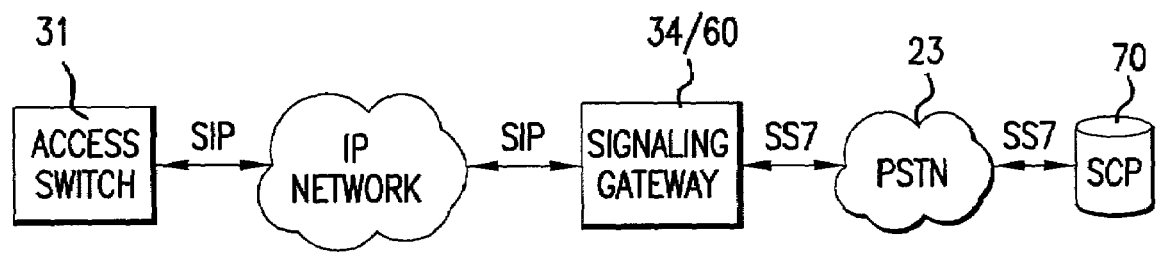
Figure 16:
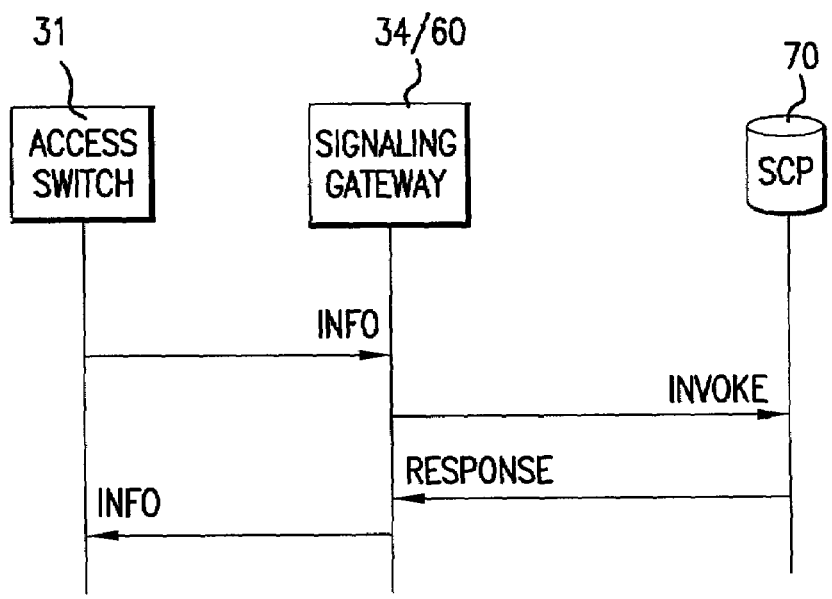

Taken together FIGS. 15 and 16 illustrate a fourth scenario in which a SIP component must retrieve data from a database (SCP) located within the SS7 network. This scenario might occur where a particular feature or TCAP service is being invoked from a SIP component. Again, message translation become necessary.

The scenario begins when access switch 31 formats a text representation of a TCAP service call in a SIP INFO message and sends it to signaling gateway 34/60. Signaling gateway 34/60 translates the TCAP representation in the INFO message into an SS7 TCAP invoke message and send it to an SCP 70. SCP 70 services the request and returns a Response message to signaling gateway 34/60. Signaling gateway 34/60 converts translates the TCAP Response into a text representation and encapsulates it into another SIP INFO message. The feature invocation is completed when the encapsulated TCAP Response is returned to access switch 31.

As illustrated by the exemplary scenarios, signaling message translation may or may not be necessary. The access switch according to the present invention may be required to interact with other, fully compatible access switches, with conventional VoIP components, or directly with the PSTN. These scenarios are only examples. One of ordinary skill in the art may well extrapolate these teaching to connections between IP based networks and other non-IP based networks, such as H.323 zones.

The architecture and the enabling components and methodologies proposed by the present invention greatly enhance reliability in VoIP networks. Reliability can be viewed from two angles. The first is overall network reliability. Carriers want their subscribers to be able to establish sessions at any time from any point within the network. For this to happen, redundant communication paths are established, whereby the failure of any one path does not destroy network connectivity. IP/MPLS network transport is well positioned to provide carriers with unprecedented network reliability at extremely reasonable costs.

Second, reliability is viewed by individual subscribers. Over and above the inherent reliability associated with his access device, a subscriber perceives network reliability in terms of the frequency with which the network is unavailable to his access device. In the proposed architecture, services are delivered by a number of network components working in combination. However, reliability for a given subscriber is largely defined by the reliability of the access switch connecting his access device. The proposed access switch is designed with high reliability in mind. Session state and subscriber information may be distributed onto multiple the line interface cards using well known techniques to minimize the overall impact of a single line interface card failure.

The present invention also provides enhanced scalability. Scalability is a concept applicable and important to carriers. Simply put, a scalability metric specifies how many individual users can make use of the carrier's network simultaneously. The two most scaleable network architectures in existence are the PSTN and the Internet. It is no coincidence that both of these networks implement a majority of their "intelligence," i.e., feature definition and service creation, at their respective edges.

For example, the CLASS 5 switch, a narrow-band device increasingly ill-suited to contemporary services, is the element in the PSTN to which the great majority of subscribers lines are connected. In many ways the CLASS 5 switch can be thought of as being on the edge of the PSTN. While the Advanced Intelligent Network (AIN) includes SCPs that maintain centralized databases, the majority of state operations are still performed at the CLASS 5 switch. The interior of the PSTN, made up of a myriad of tandem switching elements are highly specialized, performing large-scale transport functions. The core maintains state only on a limited basis.

By pushing the session state maintenance, as well as feature and service creation into the access switch in the proposed VoIP architecture, the present invention derives enhanced scalability. This partition of intelligence and functionality is sharply at odds with conventional VoIP networks which rely on specialized command protocols between media gateways and media gateway controllers.

The architecture proposed by the present invention provides carriers with additional control over the creation of services and added security. In order to create new or expanded services, carriers must maintain access and control over session state information. By moving all session state to a component at the periphery of the network and under the control of the carrier, the present invention allows greater access to and control of session state. Physical security is also enhanced. While it is certainly possible to remotely attack a component storing session state, physical access to the component greatly increases the options available to a would-be hacker. By maintaining physical control of the component storing all session state the security issues confronting a carrier are markedly reduced.

The present invention has been explained in relation to several presently preferred embodiments. These embodiments are only working examples. Certain specific protocols, technologies, and components have been chosen as part of the examples. The invention, however, is not limited to these examples. Rather, those of ordinary skill in the art will readily perceive adaptations, modifications, and extrapolations of theses teachings which fall within the scope of the present invention as defined by the attached claims.

What is claimed is:

1. A method of establishing call setup in relation to a call between calling and called parties over a Voice over Internet Protocol (VoIP) network, the VoIP network comprising a signaling gateway, a first access switch directly connecting the calling party to the VoIP network, and a second access switch connecting the called party to the VoIP network through the Public Switched Telephone Network (PSTN) and associated Signaling System Seven (SS7) network, the method comprising the steps of:

terminating the call in the first access switch;

issuing a first Signaling Initiation Protocol (SIP) INVITE message from the first access switch to the second access switch, and maintaining session state associated with the call in at least one of the first and second access switches, wherein the session state includes information related to a nature of a call and information related to control of an activity of a component in a VoIP network;

after receiving the first INVITE message, sending a second INVITE message from the second access switch to the signaling gateway; and maintaining transaction state associated with the call setup in the signaling gateway during only the pendency of the call setup transaction, wherein the transaction state includes information related to call set up, call tear down, and a feature invocation.

2. The method of claim 1, further comprising:

translating SIP messages received in the signaling gateway from the second access switch into SS7 messages and transmitting the SS7 messages to the PSTN, and translating SS7 messages received in the signaling gateway from the PSTN into SIP messages and transmitting the SIP messages to the VoIP network.

3. The method of claim 2, wherein the step of translating SIP messages received in the signaling gateway from the second access switch into SS7 messages and transmitting the SS7 messages to the PSTN further comprises:

forming an IAM (Initial Address Message) in the signaling gateway in response to the second INVITE message, and transmitting the IAM to the PSTN.

4. The method of claim 3, wherein the step of translating SS7 messages received in the signaling gateway from the PSTN into SIP messages and transmitting the SIP messages to the second access switch further comprises:

forming a first 200 OK message in the signaling gateway in response to an ACM ("Address Completion Message") and an ANM ("Answer Message") from the PSTN and transmitting the first 200 OK message to the second access switch;

transmitting a second 200 OK messages from the second access switch to the first access switch; and thereafter, and transmitting an ACK messages from the first access switch to the second access switch.

5. A method of invoking a call feature during a call from an access device connected to a Voice over Internet Protocol (VoIP) network, the VoIP network comprising an access switch connecting the access device and a signaling gateway, the VoIP network being connected to the Public Switched Telephone Network (PSTN) and associated Signaling System Seven (SS7) network, and the method comprising the steps of:

terminating the call in the access switch;

transmitting a first Signaling Initiation Protocol (SIP) INFO message from the access switch to the signaling gateway via the VoIP network;

translating the first SIP INFO message into an SS7 compatible INVOKE message;

transmitting the INVOKE message to a Service Control Point (SCP) via the SS7 network;

in response to the INVOKE message, transmitting an SS7 RESPONSE message from the SCP to the signaling gateway;

translating the RESPONSE message into a second SIP INFO message and transmitting the second SIP INFO message from the signaling gateway to the access switch via the VoIP network.

6. The method of claim 5, further comprising:

maintaining in the access switch all session state associated with the call; and, maintaining no session state in the signaling gateway other than transaction state associated with the feature invocation.

7. The method of claim 6, wherein the signaling gateway maintains the transaction state associated with the feature invocation during only the pendency of the feature invocation transaction.

8. A signaling gateway adapted for use in a Voice over Internet Protocol (VoIP), the VoIP network being connected to the Public Switched Telephone Network (PSTN), and comprising a plurality of access switches and an IP backbone, wherein the signaling gateway comprises:

a first port receiving Session Initiation Protocol (SIP) messages from an access switch via the IP backbone;

a SIP parser/generator receiving SIP messages from the first port;

a second port receiving Signaling System Seven (SS7) messages from an SS7 network associated with the PSTN;

a SS7 protocol stack receiving SS7 messages from the second port;

a translator receiving SIP messages from the SIP parser/generator, directly translating the SIP messages into resulting SS7 messages, and transmitting the resulting SS7 messages to the SS7 protocol stack for subsequent transmission to the SS7 network; and wherein the translator also receives SS7 messages from the SS7 protocol stack, directly translates the SS7 messages into resulting SIP messages, and transmits the resulting SIP messages to the SIP parser/generator for subsequent transmission to the VoIP network.

9. The signaling gateway of claim 8, further comprising:

a memory maintaining transaction state associated with a SIP transaction message received from the VoIP network, wherein the transaction state is maintained in memory only during the pendency of the transaction.

10. The signaling gateway of claim 8, further comprising:

a memory maintaining transaction state associated with a SS7 transaction message received from the PSTN, wherein the transaction state is maintained in memory only during the pendency of the transaction.

* * * * *